US012279138B2

(12) United States Patent
Li et al.

(10) Patent No.: US 12,279,138 B2
(45) Date of Patent: Apr. 15, 2025

(54) DETECTION METHOD, APPARATUS, AND SYSTEM

(71) Applicant: Huawei Technologies Co., Ltd., Shenzhen (CN)

(72) Inventors: Changlu Li, Nanjing (CN); Dewei Bao, Nanjing (CN); Qikun Wei, Nanjing (CN); Fuqing Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 17/683,995

(22) Filed: Mar. 1, 2022

(65) Prior Publication Data
US 2022/0182864 A1 Jun. 9, 2022

Related U.S. Application Data

(63) Continuation of application No. PCT/CN2020/112902, filed on Sep. 1, 2020.

(30) Foreign Application Priority Data

Sep. 2, 2019 (CN) .......................... 201910824288.7
Sep. 13, 2019 (CN) .......................... 201910866845.1

(51) Int. Cl.
*H04W 24/08* (2009.01)
*H04W 48/16* (2009.01)
*H04W 84/12* (2009.01)

(52) U.S. Cl.
CPC .......... *H04W 24/08* (2013.01); *H04W 48/16* (2013.01); *H04W 84/12* (2013.01)

(58) Field of Classification Search
CPC ..... H04W 24/08; H04W 48/16; H04W 84/12; H04W 24/02; H04W 88/12; H04B 17/3912; H04B 17/27; H04B 17/318
USPC .................................................. 370/241, 252
See application file for complete search history.

(56) References Cited

U.S. PATENT DOCUMENTS

| 2008/0062942 | A1 | 3/2008 | Hills et al. |
| 2008/0253314 | A1 | 10/2008 | Stephenson et al. |
| 2012/0243474 | A1* | 9/2012 | Lyer .................... H04L 63/1466 370/328 |
| 2014/0348165 | A1 | 11/2014 | Frydman et al. |

(Continued)

FOREIGN PATENT DOCUMENTS

| CN | 101640889 A | 2/2010 |
| CN | 103916816 A | 7/2014 |
| CN | 107113639 A | 8/2017 |

OTHER PUBLICATIONS

Aruba, "Aruba Networks Solution, Analytics and Assurance," 2018, 26 pages.

*Primary Examiner* — Obaidul Huq
(74) *Attorney, Agent, or Firm* — Conley Rose, P.C.

(57) ABSTRACT

A detection method includes: obtaining at least one feature of a first access point (AP), where the at least one feature includes a quantity of target terminals that request to access the first AP within a time period with duration being first duration, and the target terminal is a terminal whose access status is abnormal; and detecting, based on the at least one feature, whether the first AP is a logical edge AP, where the logical edge AP is an AP whose signal coverage area reaches an edge of a signal coverage area of a wireless local area network (WLAN) in which the AP is located.

26 Claims, 5 Drawing Sheets

(56) References Cited

U.S. PATENT DOCUMENTS

| | | |
|---|---|---|
| 2016/0142967 A1 | 5/2016 | Lee |
| 2016/0366141 A1* | 12/2016 | Smith .................. H04L 63/062 |
| 2017/0064567 A1 | 3/2017 | Ponnuswamy |
| 2017/0238237 A1* | 8/2017 | Chen ....................... H04L 43/16 |
| | | 370/328 |
| 2020/0084692 A1* | 3/2020 | Parron .............. H04W 28/0226 |

* cited by examiner

DETECTION METHOD, APPARATUS, AND SYSTEM

CROSS-REFERENCE TO RELATED APPLICATIONS

This is a continuation of Int'l Patent App. No. PCT/CN2020/112902, filed on Sep. 1, 2020, which claims priority to Chinese Patent App. No. 201910866845.1, filed on Sep. 13, 2019, and Chinese Patent App. No. 201910824288.7, filed on Sep. 2, 2019, all of which are incorporated by reference.

FIELD

This disclosure relates to the communication field, and in particular, to a detection method, apparatus, and system.

BACKGROUND

A wireless local area network (WLAN) usually includes at least one access point (AP), and a user may access one AP in the WLAN to access the WLAN. The AP may provide a service for the user. To enable the AP to better provide the service for the user, currently an access controller (AC) is further disposed. The AC may manage the AP. For example, the AC may optimize the AP, so that the AP can better provide the service.

There may be a type of APs in the WLAN, a signal coverage area of the type of APs reaches an edge of a signal coverage area of the WLAN, and a road on which a pedestrian walks may exist in the signal coverage area of the AP. Existence of this type of APs may greatly affect the WLAN. Therefore, it is urgent to detect this type of APs, to optimize this type of APs and reduce impact on the WLAN. Therefore, currently how to detect this type of APs is a problem that urgently needs to be resolved.

SUMMARY

Embodiments provide a detection method, apparatus, and system, to detect a logical edge AP. The technical solutions are as follows.

According to a first aspect, a detection method includes: obtaining at least one feature of a first AP, where the at least one feature includes a quantity of target terminals that request to access the first AP within a time period with duration being first duration, and the target terminal is a terminal whose access status is abnormal; and detecting, based on the at least one feature, whether the first AP is a logical edge AP, where the logical edge AP is an AP whose signal coverage area reaches an edge of a signal coverage area of a WLAN in which the AP is located. The obtained feature of the first AP includes the quantity of target terminals that request to access the first AP within the time period with the duration being the first duration, and the target terminal is the terminal whose access status is abnormal. Therefore, whether the first AP is the logical edge AP can be successfully detected based on the feature of the first AP.

In a possible implementation, the target terminal includes at least one of a nomadic terminal, a terminal that fails to access, or a terminal that does not belong to a whitelist of the WLAN to which the first AP belongs. These types of terminals usually appear in a signal coverage area of the logical edge AP. Therefore, whether the first AP is the logical edge AP can be successfully detected based on the quantity of target terminals.

In another possible implementation, when the at least one feature meets a first condition, that the first AP is the logical edge AP is determined, where the first condition includes: the quantity of target terminals is greater than a first quantity threshold, the first AP is one of first quantity of APs with a maximum quantity of target terminals in the WLAN, or a difference between the quantity of target terminals and an average quantity of target terminals is greater than a difference threshold, where the difference threshold is equal to m times a variance, m is greater than 1, and the average quantity of target terminals and the variance are obtained based on a quantity of target terminals of each AP in the WLAN. Therefore, whether the first AP is the logical edge AP can be successfully detected according to the first condition.

In another possible implementation, the target terminal includes at least one of the nomadic terminal or the terminal that does not belong to the whitelist; connection information of at least one terminal collected by the first AP is received, where the connection information includes an identifier of the terminal, and the at least one terminal is a terminal that accesses the first AP; the target terminals are determined from the at least one terminal based on the connection information of the at least one terminal; and the quantity of the determined target terminals is counted. The first AP collects the connection information of the terminal. Therefore, the target terminals can be successfully determined based on the connection information, and further whether the first AP is the logical edge AP can be successfully detected.

In another possible implementation, an interval at which the first AP is configured to collect connection information from a same terminal for two consecutive times does not exceed an interval threshold, and the connection information further includes collection time points; a connection information sequence of any terminal in the at least one terminal is obtained, where the connection information sequence includes connection information arranged based on collection time points, each piece of connection information in the connection information sequence includes an identifier of the any terminal, and an interval between collection time points of two pieces of adjacent connection information in the connection information sequence does not exceed the interval threshold; and whether the any terminal is a nomadic terminal is determined based on the connection information sequence. In this way, the connection information sequence of the terminal can be obtained from the connection information collected by the AP. Therefore, the nomadic terminal can be successfully determined based on the connection information sequence.

In another possible implementation, a start time point at which the any terminal accesses the first AP, stay duration of the any terminal in the first AP, and a disconnection time point at which the any terminal disconnects from the first AP are obtained based on the connection information sequence; and that the any terminal is the nomadic terminal is determined when the stay duration does not exceed a first time threshold and there is no connection information of the any terminal collected by a second AP within preset duration before the start time point and within preset duration after the disconnection time point, where the second AP is an AP other than the first AP in the WLAN, and the preset duration is greater than the interval threshold. The stay duration, the access start time point, and the disconnection time point of the any terminal are obtained. Therefore, whether the any terminal is the nomadic terminal can be successfully determined based on the stay duration, the start time point, and the disconnection time point.

In another possible implementation, the at least one feature further includes a total quantity of each type of connection events in at least one type of connection events of the at least one terminal; and for any type of connection events in each type of connection events, the first condition further includes that a total quantity of any type of connection events is greater than a quantity threshold corresponding to the any type of connection events, or the first condition further includes that a total quantity of any type of connection events is less than a quantity threshold corresponding to the any type of connection events. The at least one feature further includes the total quantity of each type of connection events. This can improve accuracy of detecting the logical edge AP.

In another possible implementation, the connection information of the any terminal further includes at least one of an uplink signal strength of the any terminal or a data transmission latency of the any terminal; a connection event of the any terminal is obtained based on at least one of an uplink signal strength or a data transmission latency included in a last piece of connection information in the connection information sequence of the any terminal; and a total quantity of any type of connection events is counted. In this way, the connection event of the terminal can be obtained, the total quantity of connection events can be further counted, and accuracy of detecting the logical edge AP can be improved based on the total quantity of connection events.

In another possible implementation, the connection information further includes at least one of a signal-to-noise ratio, a packet loss rate, a retransmission rate, channel utilization of the terminal, and an identifier of a frequency band accessed by the terminal; the at least one feature further includes at least one of a signal-to-noise ratio statistical value, a packet loss rate statistical value, a retransmission rate statistical value, a channel utilization statistical value, or a total quantity of terminals that access the frequency band corresponding to the identifier of the frequency band; and the signal-to-noise ratio statistical value is obtained based on a signal-to-noise ratio of the at least one terminal, the packet loss rate statistical value is obtained based on a packet loss rate of the at least one terminal, the retransmission rate statistical value is obtained based on a retransmission rate of the at least one terminal, and the channel utilization statistical value is obtained based on channel utilization of the at least one terminal; and the first condition further includes at least one of a condition that the signal-to-noise ratio statistical value is less than a signal-to-noise ratio statistical threshold, a condition that the packet loss rate statistical value is greater than a packet loss rate statistical threshold, a condition that the retransmission rate statistical value is greater than a retransmission rate statistical threshold, a condition that the channel utilization statistical value is greater than a channel utilization threshold, or a condition that the total quantity of terminals is greater than a terminal quantity threshold. This can enrich the feature of the first AP and improve accuracy of detecting the logical edge AP.

In another possible implementation, a random forest model is trained by using a training set, where the training set includes a plurality of training samples and a category corresponding to each training sample, a training sample whose category is a positive sample includes at least one feature of a logical edge AP, and a training sample whose category is a negative sample includes at least one feature of a non-logical edge AP; the trained random forest model includes at least one decision tree, each path in the decision tree is used to detect whether any AP in the training set is a logical edge AP, a leaf node of the path is configured to store a detection result of the path, and a node other than the leaf node in the path corresponds to a category and a feature threshold; the node is configured to determine whether a first feature exceeds the feature threshold corresponding to the node, and select, based on a determining result, a next-layer node that belongs to the path; and the first feature is a feature of the any AP that belongs to the category corresponding to the node; and a category corresponding to each feature of the first AP that needs to be obtained, a feature threshold, and a determining condition between the feature and the feature threshold are determined based on the at least one decision tree. In this way, the category corresponding to each feature of the first AP that needs to be obtained may be determined based on the trained random forest model. A feature used to reflect a characteristic of the logical edge AP can be determined, and the logical edge AP can be successfully detected based on the feature. In addition, a quantity of obtained features can be further reduced, and an amount of data to be calculated can be reduced.

In another possible implementation, when it is detected that the first AP is the logical edge AP, an AC is indicated to reduce a signal coverage area of the first AP, the AC is indicated to control the first AP to prevent a terminal whose downlink signal strength is less than a downlink signal strength threshold from accessing the first AP, or the AC is indicated to enable a delayed access function of the first AP. This can optimize performance of the logical edge AP and reduce impact caused by the logical edge AP.

According to a second aspect, a detection method includes: receiving connection information of at least one terminal collected by a first AP, where the connection information includes an identifier of the terminal and a collection time point at which the connection information is collected, and the at least one terminal is a terminal that accesses the first AP; obtaining a connection information sequence of any terminal in the at least one terminal, where the connection information sequence includes connection information arranged based on collection time points, each piece of connection information in the connection information sequence includes an identifier of the any terminal, and an interval between collection time points of two pieces of adjacent connection information in the connection information sequence does not exceed an interval threshold; and determining, based on the connection information sequence, whether the any terminal is a nomadic terminal. The connection information sequence of the terminal can be obtained from the connection information collected by the AP. Therefore, the nomadic terminal can be successfully determined based on the connection information sequence.

In a possible implementation, a start time point at which the any terminal accesses the first AP, stay duration of the any terminal in the first AP, and a disconnection time point at which the any terminal disconnects from the first AP are obtained based on the connection information sequence; and that the any terminal is the nomadic terminal is determined when the stay duration does not exceed a first time threshold and there is no connection information of the any terminal collected by a second AP within preset duration before the start time point and within preset duration after the disconnection time point, where the second AP is an AP other than the first AP in a WLAN to which the first AP belongs. The stay duration, the access start time point, and the disconnection time point of the any terminal are obtained. Therefore, whether the any terminal is the nomadic terminal can be successfully determined based on the stay duration, the start time point, and the disconnection time point.

According to a third aspect, a detection apparatus is configured to perform the method in any one of the first aspect or the possible implementations of the first aspect. Specifically, the apparatus includes units configured to perform the method according to any one of the first aspect or the possible implementations of the first aspect.

According to a fourth aspect, a detection apparatus is configured to perform the method in any one of the second aspect or the possible implementations of the second aspect. Specifically, the apparatus includes units configured to perform the method according to any one of the second aspect or the possible implementations of the second aspect.

According to a fifth aspect, a detection apparatus includes a processor and a memory. The processor and the memory may be connected through a bus system. The memory is configured to store one or more programs, and the processor is configured to execute the one or more programs in the memory, to complete the method in the first aspect, the second aspect, any one of the possible implementations of the first aspect, or any one of the possible implementations of the second aspect.

According to a sixth aspect, a computer-readable storage medium stores instructions; and when the instructions are run on a processor, the processor is enabled to perform the method in the first aspect, the second aspect, any one of the possible implementations of the first aspect, or any one of the possible implementations of the second aspect.

According to a seventh aspect, a computer program product includes instructions. When the computer program product runs on a processor, the processor is enabled to perform the method in the first aspect, the second aspect, any one of the possible implementations of the first aspect, or any one of the possible implementations of the second aspect.

According to an eighth aspect, a detection system includes a data analyzer CI and a first AP. The first AP collects connection information of at least one terminal, and sends the connection information to the CI, where the connection information includes an identifier of the terminal and a collection time point at which the connection information is collected, and the at least one terminal is a terminal that accesses the first AP. The CI obtains at least one feature of the first AP based on the connection information, where the at least one feature includes a quantity of target terminals that request to access the first AP within a time period with duration being first duration, and the target terminal includes at least one of a nomadic terminal or a terminal that does not belong to a whitelist of a WLAN in which the first AP is located; and detects, based on the at least one feature, whether the first AP is a logical edge AP, where the logical edge AP is an AP whose signal coverage area reaches an edge of a signal coverage area of the WLAN in which the AP is located. The obtained feature of the first AP includes the quantity of target terminals that request to access the first AP within the time period with the duration being the first duration, and the target terminal includes at least one of the nomadic terminal or the terminal that does not belong to the whitelist of the WLAN in which the first AP is located. Therefore, whether the first AP is the logical edge AP can be successfully detected based on the feature of the first AP.

In a possible implementation, the system further includes an AC. The CI sends an optimization request to the AC when detecting that the first AP is the logical edge AP, where the optimization request includes an identifier of the first AP. The AC reduces a signal coverage area of the first AP, controls the first AP to prevent a terminal whose downlink signal strength is less than a downlink signal strength threshold from accessing the first AP, or enables a delayed access function of the first AP. This can optimize performance of the logical edge AP and reduce impact caused by the logical edge AP.

According to a ninth aspect, a detection system includes a data analyzer CI and a first AP. The first AP collects connection information of at least one terminal, and sends the connection information to the CI, where the connection information includes an identifier of the terminal and a collection time point at which the connection information is collected, and the at least one terminal is a terminal that accesses the first AP. The CI obtains a connection information sequence of any terminal in the at least one terminal, where the connection information sequence includes connection information arranged based on collection time points, each piece of connection information in the connection information sequence includes an identifier of the any terminal, and an interval between collection time points of two pieces of adjacent connection information in the connection information sequence does not exceed an interval threshold; and determines, based on the connection information sequence, whether the any terminal is a nomadic terminal. In this way, the connection information sequence of the terminal can be obtained from the connection information collected by the first AP. Therefore, the nomadic terminal can be successfully determined based on the connection information sequence.

DETAILED DESCRIPTION

Currently, a WLAN may be deployed in a place, for example, a building, so that a terminal located in the place accesses the WLAN. The WLAN includes at least one AP, and a terminal located in a signal coverage area of the WLAN may access any AP of the at least one AP to access the WLAN.

For a WLAN deployed in a place, for example, a canteen, an office area, or a coffee shop, there may be a type of APs in the WLAN. The AP may be a logical edge AP, and the logical edge AP is an AP whose signal coverage area reaches an edge of a signal coverage area of the WLAN. When the AP is the logical edge AP, a large quantity of target terminals may request to access the AP within a time period with duration being first duration. For example, within the time period with the duration being the first duration, the quantity of target terminals that request to access the AP exceeds a first quantity threshold. The target terminal includes a terminal whose access status is abnormal. For example, the target terminal may include at least one of a terminal that fails to access the AP, a terminal that stays in the WLAN for duration not exceeding a first time threshold, or a terminal that does not belong to a whitelist of the WLAN.

Figure 1:
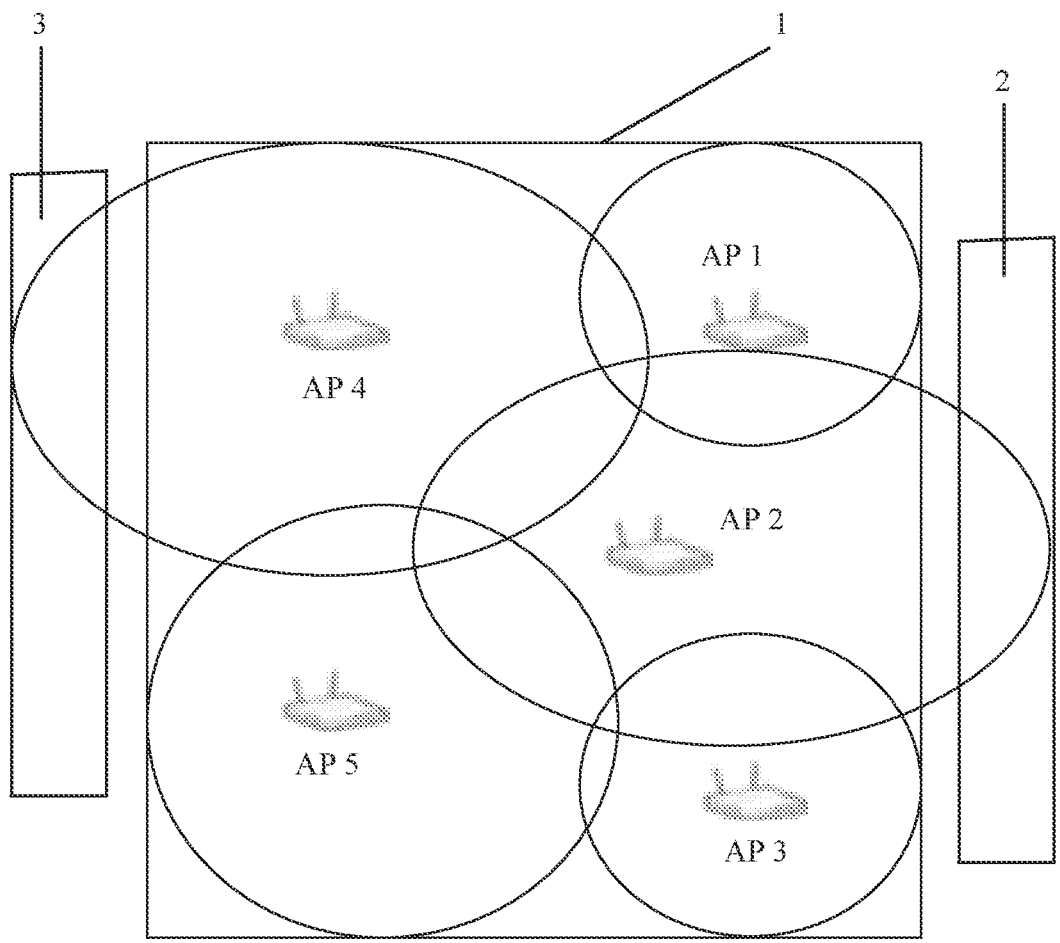
FIG. 1 is a schematic diagram of a structure of a WLAN according to an embodiment.

A signal coverage area of the AP usually reaches the edge of the signal coverage area of the WLAN. The signal coverage area of the AP may further exceed a range of the place, and may cover a pedestrian road located outside the place. The AP may be an edge AP located at the edge of the WLAN, or may be an edge AP which is not located at the edge of the WLAN. Refer to a WLAN deployed in a place 1 shown in FIG. 1. In the WLAN, an AP 1, an AP 3, an AP 4, and an AP 5 are edge APs located at an edge of the WLAN, and an AP 2 is not an edge AP located at the edge of the WLAN. A signal coverage area of the AP 2 reaches the edge of the signal coverage area of the WLAN, extends beyond the place 1, and covers a road 2 located outside the place 1. The AP 4 is an edge AP located at the edge of the WLAN, and a signal coverage area of the AP 4 also extends beyond the place 1, and covers another road 3 located outside the place 1. Therefore, the AP 2 and the AP 4 are APs of this type.

Because a road on which a pedestrian walks may exist in the signal coverage area of the AP, a user walking on the road may pass through the coverage area of the AP. When the user passes through the coverage area of the AP, a terminal of the user requests to access the AP to access the WLAN. If the terminal of the user successfully accesses the AP, and the user may quickly leave the signal coverage area of the AP after accessing the AP, or even leave the signal coverage area of the WLAN, the terminal of the user disconnects from the AP. Consequently, the terminal of the user stays in the WLAN for short duration, and the stay duration may not exceed a first time threshold. The terminal is also referred to as a nomadic terminal if the duration for which the terminal stays in the WLAN does not exceed the first time threshold, and the terminal does not access any AP in the WLAN within preset duration before accessing the AP and within preset duration after disconnecting from the AP.

Each AP in the WLAN may store a whitelist of the WLAN. For example, it is assumed that the place is an office area of a company. In this case, the whitelist of the WLAN may include identifiers of terminals of employees of the company. However, a large proportion of people walking on the road are not employees of the company. Consequently, terminals that request to access the AP may include many terminals that do not belong to the whitelist.

When a terminal that does not belong to the whitelist requests to access the AP, the AP may reject access of the terminal. Consequently, the terminal fails to access the AP. Alternatively, the road is usually located at the edge of the signal coverage area of the WLAN, and signal strength of the WLAN is weak. In addition, because the user may quickly pass through the signal coverage area of the AP, the terminal of the user may fail to access the AP.

Therefore, the signal coverage area of the AP reaches the edge of the signal coverage area of the WLAN, and the terminals that request to access the AP may include a large quantity of nomadic terminals that stay in the WLAN for duration not exceeding the first time threshold, terminals that fail to access the AP, or terminals that do not belong to the whitelist of the WLAN. Therefore, the AP is a logical edge AP.

The logical edge AP may generate the following impact:

According to a first aspect, the logical edge AP has great impact on the nomadic terminal. Before entering a signal coverage area of the logical edge AP, the nomadic terminal may use a high-quality mobile network to provide an internet access service for an application running on the nomadic terminal. When entering the signal coverage area of the logical edge AP, the nomadic terminal automatically accesses the WLAN by accessing the logical edge AP. The nomadic terminal is located at an edge of the signal coverage area of the logical edge AP, and a signal of the logical edge AP at a location of the nomadic terminal is weak. Therefore, internet access experience may be deteriorated after the logical edge AP is accessed. When the nomadic terminal leaves the signal coverage area of the logical edge AP, the nomadic terminal does not use the mobile network again to provide the internet access service for the application running on the nomadic terminal, and the internet access service provided for the application running on the nomadic terminal is interrupted.

According to a second aspect, the logical edge AP has great impact on a resident terminal that accesses the logical edge AP or a terminal that belongs to the whitelist of the WLAN. The resident terminal is a terminal that stays in the logical edge AP for duration exceeding the first time threshold after accessing the logical edge AP. The large quantity of nomadic terminals or the terminals that do not belong to the whitelist may access the logical edge AP. Therefore, a large quantity of network resources of the logical edge AP are consumed, and network resources used by the resident terminal located in the logical edge AP or the terminal that belongs to the whitelist are affected.

According to a third aspect, the logical edge AP also has great impact on the WLAN. A large quantity of control plane messages are generated when the large quantity of nomadic terminals request to access the logical edge AP. Alternatively, when the large quantity of nomadic terminals leave the signal coverage area of the logical edge AP, the large quantity of nomadic terminals disconnect from the logical edge AP, and the large quantity of control plane messages are also generated, which increases network load of a control plane of the WLAN, and may cause a network fault.

To eliminate the impact caused by the logical edge AP, the logical edge AP may be detected from the APs of the WLAN, and then the logical edge AP is optimized to reduce or eliminate the impact caused by the logical edge AP.

Figure 2:
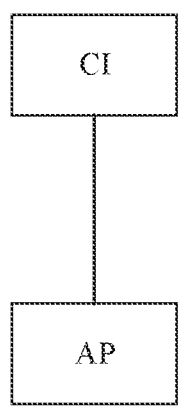
FIG. 2 is a schematic diagram of a system architecture according to an embodiment.

Refer to FIG. 2. An embodiment provides a network architecture, including: a data analyzer (e.g., campus insight (CI)) and an AP in at least one WLAN, where a network connection may be established between the CI and an AP in each WLAN.

For any AP in the AP in the at least one WLAN, for ease of description that the AP is a first AP, the CI may obtain at least one feature of the first AP, and detect, based on the at least one feature, whether the first AP is a logical edge AP.

Figure 4:
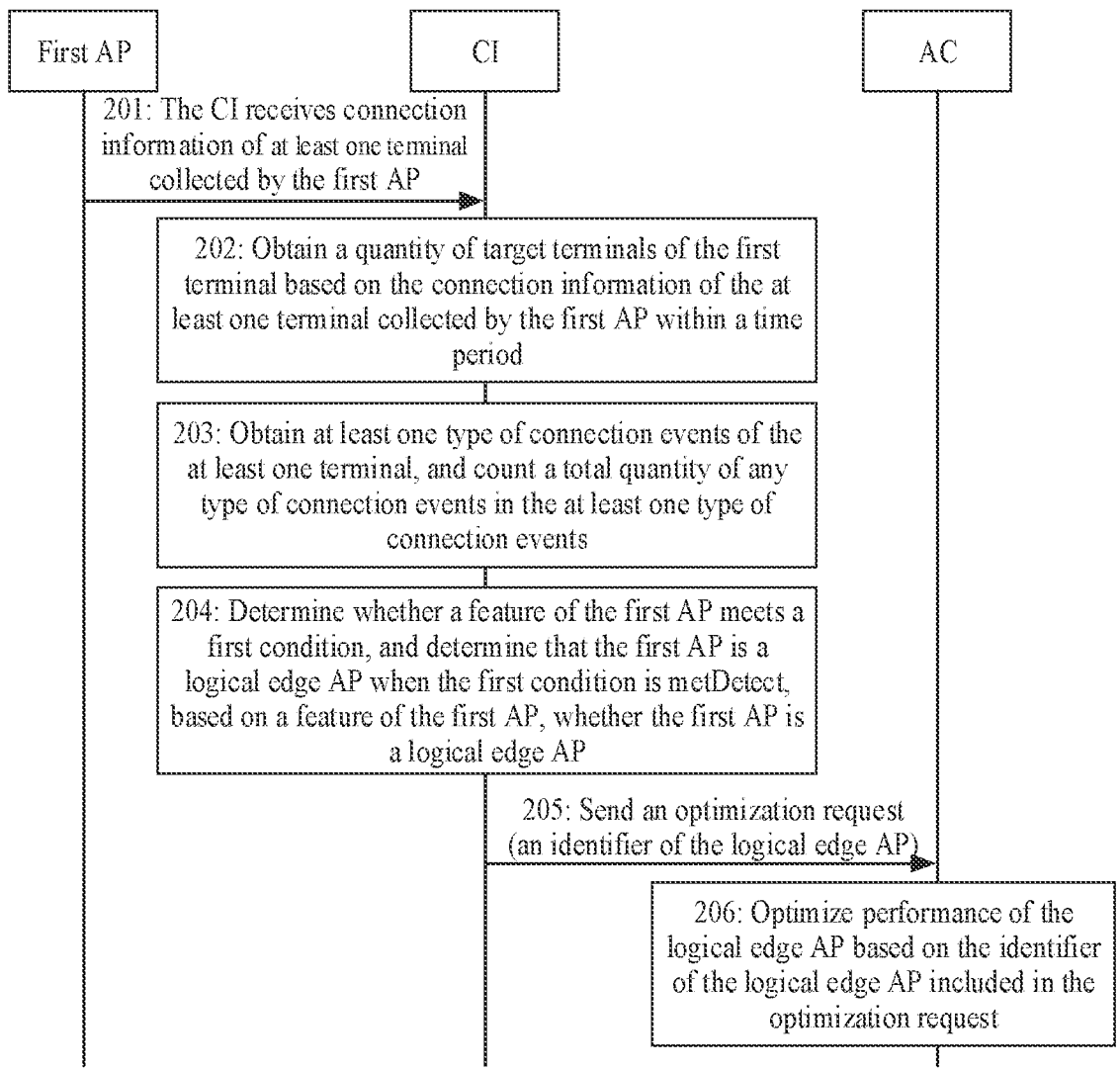
FIG. 4 is a flowchart of a detection method according to an embodiment.

A detailed process in which the CI obtains the at least one feature and a detailed process of detecting whether the first AP is the logical edge AP are described in an embodiment shown in FIG. 4, and are not described herein.

Optionally, when the at least one feature meets a first condition, it is determined that the first AP is the logical edge AP.

Optionally, the at least one feature includes a quantity of target terminals, and the quantity of target terminals may be used to reflect access statuses of the terminals that access the first AP. The first condition includes: the quantity of target terminals is greater than a first quantity threshold.

Optionally, the at least one feature may further include a total quantity of each type of connection events in at least one type of connection events, and the total quantity of each type of connection events is used to reflect a performance status of the first AP. The at least one type of connection events are connection events of at least one terminal that accesses the first AP. For any type of connection events in the at least one type of connection events, the first condition may further include that a total quantity of any type of connection events is greater than a quantity threshold corresponding to the any type of connection events, or the first condition may further include that a total quantity of any type of connection events is less than a quantity threshold corresponding to the any type of connection events.

Optionally, the at least one feature may further include at least one of a signal-to-noise ratio statistical value, a packet loss rate statistical value, a retransmission rate statistical value, a channel utilization statistical value, or the like. Any one of the signal-to-noise ratio statistical value, the packet loss rate statistical value, the retransmission rate statistical value, or the channel utilization statistical value may be used to reflect an access status of a terminal that accesses the first AP. The first condition may further include at least one of a condition that the signal-to-noise ratio statistical value is less than a signal-to-noise ratio statistical threshold, a condition that the packet loss rate statistical value is greater than a packet loss rate statistical threshold, a condition that the retransmission rate statistical value is greater than a retransmission rate statistical threshold, or a condition that the channel utilization statistical value is greater than a channel utilization threshold.

Optionally, the first AP may provide at least one frequency band for a terminal to access. For any frequency band in the at least one frequency band, the at least one feature may further include a total quantity of terminals that access the frequency band. The total quantity of terminals is used to reflect a load status of the first AP. The first condition may further include a condition that the total quantity of terminals is greater than a terminal quantity threshold.

Optionally, the CI may be a computer, a server, a server cluster, or the like.

Figure 3:
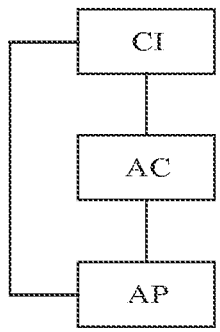
FIG. 3 is a schematic diagram of another system architecture according to an embodiment.

Optionally, refer to FIG. 3. The network architecture may further include an AC. A network connection may be established between the AC and the CI, and a network connection may be established between the AC and the AP in the at least one WLAN.

The AC is configured to optimize performance of any AP in the at least one WLAN.

Optionally, when the CI detects that the first AP is the logical edge AP, the CI may send an optimization request to the AC, where the optimization request includes an identifier of the first AP. The AC receives the optimization request, and optimizes performance of the first AP based on the identifier of the first AP included in the optimization request.

A detailed implementation process in which the AC optimizes the performance of the first AP is described in the following embodiment shown in FIG. 4, and is not described in detail herein.

Refer to FIG. 4. An embodiment provides a detection method. The detection method is used to detect whether an AP in a WLAN is a logical edge AP. The method may be applied to the network architecture shown in FIG. 2 or FIG. 3, and includes the following steps.

Step 201: A CI receives connection information of at least one terminal collected by a first AP. For any terminal in the at least one terminal, connection information of the any terminal includes an identifier of the any terminal and a collection time point at which the first AP collects the connection information.

The CI may be configured to detect an AP in at least one WLAN, in other words, the CI is configured to detect an AP in one WLAN or detect APs in a plurality of WLANs. The first AP is any AP in the at least one WLAN. The at least one terminal is a terminal that accesses the first AP.

The AP in the at least one WLAN detected by the CI may be configured by an administrator. For example, for each WLAN in the at least one WLAN, if an administrator of the WLAN needs the CI to detect an AP in the WLAN, the administrator may enter an identifier of each AP in the WLAN and an identifier of the WLAN on the CI.

The CI may correspondingly store the identifier of each AP in the WLAN and the identifier of the WLAN into a correspondence between the identifier of the AP and the identifier of the WLAN. The CI sends a collection request to each AP in the WLAN based on the identifier of the AP, to trigger the AP to collect connection information of a terminal that accesses the AP.

For the any terminal in the at least one terminal, the first AP may collect the connection information of the any terminal at different time points, and send the collected connection information to the CI. An interval between two consecutive time points at which the first AP collects the connection information of the any terminal does not exceed an interval threshold.

Optionally, the first AP may periodically collect the connection information of the any terminal, and a period length in which the first AP collects the connection information is less than or equal to the interval threshold.

Optionally, the connection information may further include at least one of information such as an identifier of the first AP, the collection time point at which the first AP collects the connection information, a start time point at which the any terminal accesses the first AP, stay duration at which the any terminal has stayed in the first AP, an identifier of a frequency band accessed by the any terminal, an uplink signal strength, a data transmission latency, a signal-to-noise ratio, a packet loss rate, a retransmission rate, or channel utilization of the any terminal.

The first AP may provide at least one frequency band. A terminal that accesses the first AP may select a frequency band from the at least one frequency band, and access the selected frequency band. Then, the terminal may communicate with the first AP over the accessed frequency band.

Like the first AP, any other AP in the at least one WLAN also collects connection information of a terminal that accesses the AP, and sends the collected connection information of the terminal to the CI. To be specific, the CI receives connection information of terminals sent by different APs, and the CI stores the connection information sent by the different APs.

When a terminal enters a signal coverage area of the first AP, the terminal may send an access request to the first AP to request to access the first AP. After requesting to access the first AP, the terminal may successfully access the first AP, or may fail to access the first AP.

When the terminal fails to access the first AP, the first AP detects the terminal and generates an access failure event, where the access failure event may include information such as the identifier of the first AP and a start time point at which the terminal requests access, and sends the access failure event to the CI.

Like the first AP, the any other AP in the at least one WLAN also generates an access failure event when detecting a terminal that fails to access the any other AP, and sends the generated access failure event to the CI. To be specific, the CI receives access failure events sent by different APs, and the CI stores the access failure events sent by the different APs.

Optionally, the identifier of the first AP may be an address of the first AP. For example, the identifier of the first AP may be an inter-network interconnection protocol (e.g., Internet Protocol (IP)) address or a media access control (MAC) address of the first AP.

Optionally, an identifier of a terminal may be an address of the terminal. For example, the identifier of the terminal may be an IP address or a MAC address of the terminal.

The CI may periodically detect the AP in the at least one WLAN to detect a logical edge AP. For example, the CI may start to detect the AP in the at least one WLAN at a preset time point every day.

Optionally, the CI may divide a cycle into at least one time period, and duration of each time period is equal to first duration. The AP in the WLAN is detected based on connection information collected by the AP within any time period in the at least one time period. A detection process of the CI is as follows:

Step 202: The CI obtains a quantity of target terminals of the first AP based on the connection information of the at least one terminal collected by the first AP within the time period, where the quantity of target terminals is a feature of the first AP, and the feature is used to reflect access statuses of the terminals that access the first AP.

For any piece of connection information stored in the CI, the connection information includes an identifier of an AP that collects the connection information and a collection time point at which the connection information is collected. For the first AP, the CI may obtain, from the stored connection information, connection information that includes the identifier of the first AP and an included collection time point within the time period, where the obtained connection information is connection information collected by the first AP within the time period. Then, the CI performs this step.

In this step, the target terminals may be determined from the at least one terminal based on the connection information of the at least one terminal collected by the first AP within the time period, and the quantity of target terminals may be counted. In this case, the determined target terminal includes at least one of a nomadic terminal or a terminal that does not belong to a target whitelist. The target whitelist is a whitelist of a target WLAN, and the target WLAN is a WLAN to which the first AP belongs. The quantity of target terminals may include at least one of a quantity of nomadic terminals or a quantity of terminals that do not belong to the target whitelist.

The first AP may store the target whitelist, or an AC configured to manage the target WLAN may store the target whitelist. The CI may also store the target whitelist, and the target whitelist stored in the CI may be obtained by the CI from an AP that belongs to the target WLAN, obtained by the CI from the AC, or sent by an administrator receiving the target WLAN before this step is performed.

For example, it is assumed that a place at which the target WLAN is deployed is a company, the target whitelist of the target WLAN includes identifiers of terminals of employees of the company, the administrator of the target WLAN may store the target whitelist in the AC, and the administrator may further store the target whitelist in each AP in the target WLAN. In this case, the CI may obtain the target whitelist from the AP of the target WLAN, or receive the target whitelist entered by the administrator.

Optionally, when the CI is configured to detect the AP in the one WLAN, the CI may store a whitelist, and the whitelist is a whitelist of the WLAN. When the CI is configured to detect the APs in the plurality of WLANs, when obtaining a whitelist of any WLAN, the CI may correspondingly store an identifier of each AP in the WLAN and the whitelist of the WLAN in a correspondence between the identifier of the AP and the whitelist.

Optionally, the terminals that do not belong to the target whitelist may be determined from the at least one terminal in the following manner. The manner may be as follows:

An identifier of each terminal in the at least one terminal and the identifier of the first AP are obtained from the connection information of the at least one terminal. When one whitelist is stored in the CI, the whitelist is used as the target whitelist of the target WLAN to which the first AP belongs. Alternatively, when a plurality of whitelists are stored on the CI, the target whitelist of the WLAN to which the first AP belongs is obtained based on the identifier of the first AP and a correspondence between an identifier of an AP and the whitelist. The terminals that do not belong to the target whitelist are determined from each terminal based on the identifier of each terminal and the target whitelist, and the quantity of terminals that do not belong to the target whitelist is counted.

Optionally, the nomadic terminal may be determined from the at least one terminal in the following manner. The manner may be as follows:

A connection information sequence of the any terminal in the at least one terminal is obtained from the connection information of the at least one terminal collected by the first AP within the time period, where the connection information sequence includes connection information arranged based on collection time points, each piece of connection information in the connection information sequence includes an identifier of the any terminal, and an interval between collection time points of two pieces of adjacent connection information in the connection information sequence does not exceed the interval threshold. Whether the any terminal is a nomadic terminal is determined based on the connection information sequence. The foregoing process is repeated to obtain a connection information sequence of each terminal in the at least one terminal, determine all nomadic terminals from the at least one terminal, and count the quantity of the determined nomadic terminals.

Optionally, in this step, whether the any terminal is the nomadic terminal may be determined based on the connection information sequence by using the following operations 2021 and 2022. The operations 2021 and 2022 may be as follows:

2021: The start time point at which the any terminal accesses the first AP, the stay duration of the any terminal in the first AP, and a disconnection time point at which the any terminal disconnects from the first AP are obtained based on the connection information sequence of the any terminal.

Optionally, a collection time point stored in a first piece of connection information in the connection information sequence may be used as the start time point at which the any terminal accesses the first AP, and a collection time point stored in a last piece of connection information in the connection information sequence may be used as the disconnection time point at which the any terminal disconnects from the first AP. The stay duration of the any terminal in the first AP is calculated based on the disconnection time point and the start time point.

Optionally, when each piece of connection information of the any terminal collected by the first AP includes the start time point at which the any terminal accesses the first AP and the duration for which the any terminal has stayed in the first AP, the start time point at which the any terminal accesses the first AP and the stay duration of the any terminal in the first AP may be obtained from the last piece of connection information in the connection information sequence, and the collection time point in the last piece of connection information is used as the disconnection time point at which the any terminal disconnects from the first AP.

2022: When the stay duration does not exceed a first time threshold and there is no connection information of the any terminal collected by a second AP within a first time period and a second time period, that the any terminal is the nomadic terminal is determined.

The first time period is a time period from a first time point to the start time point, and the second time period is a time period from the disconnection time point to a second time point. The first time point is earlier than the start time point, and the second time point is later than the disconnection time point. Duration of the first time period is equal to preset duration, and duration of the second time period is equal to preset duration. The preset duration is greater than the interval threshold, and the second AP is an AP other than the first AP in the target WLAN.

If there is no connection information of the any terminal collected by the second AP within the first time period, it indicates that the any terminal does not roam to the first AP from another AP of the target WLAN. If there is no connection information of the any terminal collected by the second AP within the second time period, it indicates that the any terminal does not roam to another AP of the target WLAN from the first AP.

In this step, an identifier of each of other APs in the target WLAN may be obtained based on the identifier of the first AP and a correspondence between the identifier of each of the APs and an identifier of the WLAN, and connection information collected by the other APs is obtained from the connection information stored in the CI. Whether connection information whose collection time point is within the first time period and the second time period and that includes the identifier of the any terminal exists is detected from the connection information collected by the other APs. If the connection information whose collection time point is within the first time period and the second time period and that includes the identifier of the any terminal does not exist, it is determined that there is no connection information of the any terminal collected by the second AP within the first time period and the second time period. If the connection information whose collection time point is within the first time period and the second time period and that includes the identifier of the any terminal exists, it is determined that there is the connection information of the any terminal collected by the second AP within the first time period and the second time period.

Optionally, in this step, whether the any terminal is the nomadic terminal may be determined based on the connection information sequence in another manner. The another manner is as follows:

The connection information sequence of the any terminal is used as an input to a terminal detection model, and whether the any terminal is the nomadic terminal is detected by using the terminal detection model.

Optionally, the terminal detection model is obtained by training a first artificial intelligence (AI) model by using a first training set. The first training set includes a plurality of training sequences, and each training sequence is a connection information sequence of a nomadic terminal or a connection information sequence of a non-nomadic terminal.

There are two categories of training sequences in the first training set, where a category of training sequence is a positive sample, and a training sequence of the positive sample is a connection information sequence of a nomadic terminal. The other category of training sequence is a negative sample, and a training sequence of the negative sample is a connection information sequence of a non-nomadic terminal.

Optionally, a connection information sequence of a terminal may be first obtained, the connection information sequence is used as a training sequence, and then the foregoing operations 2021 and 2022 are used to determine whether the connection information sequence is a connection information sequence of a nomadic terminal. If the connection information sequence is the connection information sequence of the nomadic terminal, a category of the training sequence is set to the positive sample. If the connection information sequence is not the connection information sequence of the nomadic terminal, the category of the training sequence is set to the negative sample. In this way, after a large quantity of training sequences are obtained, the first AI model is trained by using the training sequences to obtain the terminal detection model through training. Then, when the connection information sequence is detected, the connection information sequence may not be detected by using the operations 2021 and 2022. Instead, the terminal detection model is directly used to detect the connection information sequence.

Optionally, in this step, the terminal detection model may be trained by using the following operations 2121 to 2124. A training process is as follows:

2121: Input the training sequences in the first training set into the first AI model, where a category of each training sequence is the positive sample or the negative sample.

For ease of description, the category of each training sequence is referred to as a real category of each training sequence.

Optionally, the first AI model used in this step may be a long short-term memory (LSTM) network.

2122: The first AI model predicts the category of each training sequence in the first training set.

The first AI model extracts a feature from each training sequence in the first training set, and predicts, based on the extracted feature, a first probability that the training sequence is the positive sample and a second probability that the training sequence is the negative sample, where a sum of the first probability and the second probability is equal to 1. The first AI model outputs the category corresponding to a probability with a larger value in the two probabilities.

2123: For each training sequence, the first AI model calculates, by using a loss function, a loss function value of the training sequence based on the real category (the positive sample or the negative sample) of the training sequence and the category that is output after the first AI model predicts the training sequence. Further, a network parameter of the first AI model is adjusted based on the loss function value of each training sequence.

2124: The first AI model determines whether to continue training; and when determining to continue training, returns to perform 2122; or when determining to stop training, the first AI model ends and exits the training process, where the first AI model is a terminal detection model.

Whether to continue training may be determined based on the loss function value. Specifically, in the training process, a loss function value of each training sequence is obtained after each training, and curve fitting is performed on the obtained loss function value. If an obtained curve gradually converges and a loss function value obtained after last training is less than a preset threshold, it is determined to stop training. Otherwise, it is determined to continue training.

Optionally, the target terminal may further include a terminal that fails to access the first AP. The quantity of target terminals may further include a quantity of terminals that fail to access the first AP. To be specific, in this step, the CI may further obtain, from the access failure events stored in the CI, access failure events that include the identifier of the first AP and included start time points within the time period; and count a quantity of obtained access failure events to obtain the quantity of terminals that fail to access the first AP.

For each other AP in the target WLAN, an operation in this step is performed on each other AP to obtain a quantity of target terminals of each other AP, that is, a quantity of target terminals of each AP in the target WLAN may be obtained in this step. A quantity of target terminals for any AP may include at least one of a quantity of nomadic terminals, a quantity of terminals that do not belong to the target whitelist, or a quantity of terminals that fail to access the AP.

Optionally, the first AP may also send the collected connection information to a device other than the CI, for example, the AC. In this way, the AC may obtain the connection information sequence of the any terminal and determine whether the connection information sequence of the any terminal is a connection information sequence of a nomadic terminal; and if the connection information sequence of the any terminal is the connection information sequence of the nomadic terminal, mark the connection information sequence of the any terminal and send the connection information sequence of the any terminal to the CI; or if the connection information sequence of the any terminal is not the connection information sequence of the nomadic terminal, directly send the connection information sequence of the any terminal to the CI. In this way, the CI receives the connection information sequence of the any terminal sent by the AC; and when the connection information sequence is marked, determines that the any terminal is the nomadic terminal. In this way, a detection procedure of the nomadic terminal is separated from the CI and implemented by the another device. This can reduce calculation pressure of the CI.

Step 203: Optionally, the CI obtains at least one type of connection events of the at least one terminal, and counts a total quantity of any type of connection events in the at least one type of connection events, where the total quantity of any type of connection events is a feature of the first AP, and the feature is used to reflect a performance status of the first AP.

This step is an optional step, in other words, this step may not be performed, and step 204 is performed after step 202 is performed. Certainly, this step may alternatively be performed, and step 204 is performed after this step is performed.

Optionally, for the any terminal in the at least one terminal, the connection information of the any terminal collected by the first AP includes at least one of the uplink signal strength of the any terminal or the data transmission latency of the any terminal. In step 202, the CI has obtained the connection information sequence of the any terminal.

Optionally, the at least one type of connection events of the any terminal may include at least one of at least one type of weak coverage events, at least one type of high-latency events, at least one type of strong coverage events, at least one type of low-latency events, or the like.

Optionally, the CI may store a correspondence between a first strength threshold and a weak coverage event, and the correspondence between the first strength threshold and the weak coverage event stores at least one first strength threshold and a weak coverage event corresponding to each first strength threshold. The first strength threshold stored in the correspondence between the first strength threshold and the weak coverage event is usually small. For example, refer to correspondences between first strength thresholds and weak coverage events shown in Table 1. A first weak coverage event, a second weak coverage event, and a third weak coverage event shown in Table 1 are respectively different types of connection events.

TABLE 1

| First strength thresholds | Weak coverage events |
|---|---|
| 10 decibels (dB) | First weak coverage event |
| 12 dB | Second weak coverage event |
| 7 dB | Third weak coverage event |
| ... | ... |

Optionally, the CI may store a correspondence between a first latency threshold and a high-latency event, and the correspondence between the first latency threshold and the high-latency event stores at least one first latency threshold and a high-latency event corresponding to each first latency threshold. The first latency threshold stored in the correspondence between the first latency threshold and the high-latency event is usually large. For example, refer to correspondences between first latency thresholds and high-latency events shown in Table 2. A first high-latency event, a second high-latency event, and a third high-latency event shown in Table 2 are respectively different types of connection events.

TABLE 2

| First latency thresholds | High-latency events |
|---|---|
| 3 | First high-latency event |
| 5 | Second high-latency event |
| 7 | Third high-latency event |
| ... | ... |

Optionally, the CI may store a correspondence between a second strength threshold and a strong coverage event, and the correspondence between the second strength threshold and the strong coverage event stores at least one second strength threshold and a strong coverage event corresponding to each second strength threshold. The second strength threshold stored in the correspondence between the second strength threshold and the strong coverage event is usually large. For example, refer to correspondences between second strength thresholds and strong coverage events shown in Table 3. A first strong coverage event, a second strong coverage event, and a third strong coverage event shown in Table 3 are respectively different types of connection events.

TABLE 3

| Second strength thresholds | Strong coverage events |
| --- | --- |
| 50 dB | First strong coverage event |
| 52 dB | Second strong coverage event |
| 67 dB | Third strong coverage event |
| ... | ... |

Optionally, the CI may store a correspondence between a second latency threshold and a low-latency event, and the correspondence between the second latency threshold and the low-latency event stores at least one second latency threshold and a low-latency event corresponding to each second latency threshold. The second latency threshold stored in the correspondence between the second latency threshold and the low-latency event is usually small. For example, refer to correspondences between second latency thresholds and low-latency events shown in Table 4. A first low-latency event, a second low-latency event, and a third low-latency event shown in Table 4 are respectively different types of connection events.

TABLE 4

| Second latency thresholds | Low-latency events |
| --- | --- |
| 2 | First low-latency event |
| 1.5 | Second low-latency event |
| 1 | Third low-latency event |
| ... | ... |

In this step, the following operations 2031 and 2032 may be implemented, and the operations 2031 and 2032 are respectively as follows:

2031: The connection events of the at least one type of the any terminal are obtained based on at least one of an uplink signal strength or a data transmission latency included in the last piece of connection information in the connection information sequence of the any terminal.

Optionally, when the last piece of connection information in the connection information sequence of the any terminal includes the uplink signal strength, a first strength threshold greater than the uplink signal strength is selected from first strength thresholds stored in correspondences between the first strength thresholds and weak coverage events. A corresponding weak coverage event is obtained from the correspondences between the first strength thresholds and the weak coverage events based on each selected first strength threshold, and the obtained weak coverage event is used as a weak coverage event of the any terminal. Alternatively, a second strength threshold less than the uplink signal strength is selected from second strength thresholds stored in correspondences between the second strength thresholds and strong coverage events. A corresponding strong coverage event is obtained from the correspondences between the second strength thresholds and the strong coverage events based on each selected second strength threshold, and the obtained strong coverage event is used as a strong coverage event of the any terminal.

For example, the uplink signal strength included in the last piece of connection information in the connection information sequence of the any terminal is 8. The first strength thresholds greater than 8 and obtained from the correspondences between the first strength thresholds and the weak coverage events shown in Table 1 are respectively 10 and 12. The first weak coverage event corresponding to the first strength threshold 10 and the second weak coverage event corresponding to the second strength threshold 12 are obtained from the correspondences between the first strength thresholds and the weak coverage events shown in Table 1 based on the first strength thresholds 10 and 12. In other words, the first weak coverage event and the second weak coverage event of the any terminal are obtained.

The weak coverage event of the any terminal is used to indicate that the any terminal may be located at an edge of the first AP. When the any terminal is far from a location of the first AP, a signal covered by the first AP at a location of the any terminal may be weak. The strong coverage event of the any terminal is used to indicate that the any terminal may be close to the first AP, and the signal covered by the first AP at the location of the any terminal may be strong.

Optionally, when the last piece of connection information in the connection information sequence of the any terminal includes the data transmission latency, a first latency threshold less than the data transmission latency is selected from first latency thresholds stored in correspondences between the first latency thresholds and high-latency events. A corresponding high-latency event is obtained from the correspondences between the first latency thresholds and the high-latency events based on each selected first latency threshold, and the obtained high-latency event is used as a high-latency event of the any terminal. Alternatively, a second latency threshold greater than the data transmission latency is selected from second latency thresholds stored in correspondences between the second latency thresholds and low-latency events. A corresponding low-latency event is obtained from the correspondences between the second latency thresholds and the low-latency events based on each selected second latency threshold, and the obtained low-latency event is used as a low-latency event of the any terminal.

For example, the data transmission latency included in the last piece of connection information in the connection information sequence of the any terminal is 6. The latency thresholds less than 6 and obtained from the correspondences between the first latency thresholds and the high-latency events shown in Table 2 are respectively 3 and 5. The first high-latency event corresponding to the latency threshold 3 and the second high-latency event corresponding to the latency threshold 5 are obtained from the correspondences between the first latency thresholds and the high-latency events shown in Table 2 based on the latency thresholds 3 and 5. In other words, the first high-latency event and the second high-latency event of the any terminal are obtained.

The high-latency event of the any terminal is used to indicate that the any terminal may be located at the edge of the first AP. When the any terminal is far from the location of the first AP, the signal covered by the first AP at the location of the any terminal may be weak. Consequently, a transmission latency required for data sent by the any terminal to the first AP is high. The low-latency event of the any terminal is used to indicate that the any terminal may be close to the first AP, and the signal covered by the first AP at the location of the any terminal may be strong. Consequently, the transmission latency required for the data sent by the any terminal to the first AP is low.

2032: For the any type of connection events in the at least one type of connection events of the at least one terminal, the total quantity of any type of connection events is counted.

Optionally, the connection information of the any terminal further includes at least one of the information such as the signal-to-noise ratio, the packet loss rate, the retransmission rate, the channel utilization of the any terminal, and the identifier of the frequency band accessed by the any terminal.

Optionally, the CI may further obtain, based on the connection information of the at least one terminal collected by the first AP within the time period, at least one of a signal-to-noise ratio statistical value, a packet loss rate statistical value, a retransmission rate statistical value, a channel utilization statistical value, a total quantity of terminals that access the frequency band corresponding to the identifier of the frequency band, or the like.

Any one of the signal-to-noise ratio statistical value, the packet loss rate statistical value, the retransmission rate statistical value, or the channel utilization statistical value is a feature of the first AP, and the feature is also used to reflect the access status of the terminal that accesses the first AP. The total quantity of terminals is also a feature of the first AP, and the feature is used to reflect a load status of the first AP.

Optionally, for the foregoing signal-to-noise ratio statistical value, an average signal-to-noise ratio may be calculated based on signal-to-noise ratios of the at least one terminal, and the average signal-to-noise ratio is used as the signal-to-noise ratio statistical value. Alternatively, the signal-to-noise ratios of the at least one terminal are sorted, and a signal-to-noise ratio in a middle position is used as the signal-to-noise ratio statistical value. Alternatively, a maximum signal-to-noise ratio or a minimum signal-to-noise ratio is selected from the signal-to-noise ratios of the at least one terminal as the signal-to-noise ratio statistical value.

Optionally, for the foregoing packet loss rate statistical value, an average packet loss rate may be calculated based on packet loss rates of the at least one terminal, and the average packet loss rate is used as the packet loss rate statistical value. Alternatively, the packet loss rates of the at least one terminal are sorted, and a packet loss rate in a middle position is used as the packet loss rate statistical value. Alternatively, a maximum packet loss rate or a minimum packet loss rate is selected from the packet loss rates of the at least one terminal as the packet loss rate statistical value.

Optionally, for the retransmission rate statistical value, an average retransmission rate may be calculated based on retransmission rates of the at least one terminal, and the average retransmission rate is used as the retransmission rate statistical value. Alternatively, the retransmission rates of the at least one terminal are sorted, and a retransmission rate in a middle position is used as the retransmission rate statistical value. Alternatively, a maximum retransmission rate or a minimum retransmission rate is selected from the retransmission rates of the at least one terminal as the retransmission rate statistic value.

Optionally, for the foregoing channel utilization statistical value, average channel utilization may be calculated based on channel utilization of the at least one terminal, and the average channel utilization is used as the channel utilization statistical value. Alternatively, the channel utilization of the at least one terminal is sorted, and channel utilization in a middle position is used as the channel utilization statistical value. Alternatively, a maximum channel utilization or a minimum channel utilization is selected from the channel utilization of the at least one terminal as the channel utilization statistical value.

Optionally, if a category of each feature of the first AP that needs to be obtained has been determined before step 202 is performed, only the feature that belongs to the determined category needs to be obtained in steps 202 and 203. For example, it is assumed that the determined category includes a quantity of nomadic terminals, a quantity of first high-latency events, and a quantity of first weak coverage events. In step 202, the CI may obtain a quantity of nomadic terminals of the first AP. When the connection event of the any terminal is obtained in step 203, for the any terminal that accesses the first AP, the CI reads the uplink signal strength and the data transmission latency from the last piece of connection information in the connection information sequence of the any terminal; obtains, from correspondences between strength thresholds and weak coverage events, a strength threshold corresponding to the first weak coverage event; and when the uplink signal strength is less than the obtained strength threshold, determines that the connection event of the any terminal includes the first weak coverage event; obtains, from correspondences between latency thresholds and high-latency events, a latency threshold corresponding to the first high-latency event; and when the data transmission latency is greater than the obtained latency threshold, determines that the connection event of the any terminal includes the first high-latency event. Then, the CI counts a total quantity of first weak coverage events and a total quantity of first high-latency events.

Step 204: The CI determines whether the feature of the first AP meets a first condition, and determines that the first AP is a logical edge AP when the first condition is met.

In this step, the CI may detect whether the first AP is the logical edge AP in the following three manners. The three manners are respectively as follows:

Manner 1: The CI detects, based on the quantity of target terminals of the first AP and the first condition, that the first AP is the logical edge AP. The first condition includes: the quantity of target terminals is greater than a first quantity threshold, the first AP is one of first quantity of APs with a maximum quantity of target terminals in the target WLAN, or a difference between the quantity of target terminals and an average quantity of target terminals is greater than a difference threshold. The difference threshold is equal to m times a variance, m is greater than 1, and the average quantity of target terminals and the variance are obtained based on a quantity of target terminals of each AP in the target WLAN.

The difference between the quantity of target terminals and the average quantity of target terminals is equal to the quantity of target terminals minus the average quantity of target terminals.

When the manner 1 is used, the foregoing operations of step 203 may not be performed, in other words, this step is directly performed after step 202 is performed.

In the manner 1, the CI may determine whether the quantity of target terminals of the first AP exceeds the first quantity threshold; and if the quantity of target terminals of the first AP exceeds the first quantity threshold, detects that the first AP is the logical edge AP. Alternatively, the CI selects, from the target WLAN, a preset quantity of APs with a maximum quantity of target terminals as logical edge APs. Alternatively, the CI calculates the average quantity of target terminals and the variance based on the quantity of target terminals of each AP in the target WLAN, and subtracts the average quantity of target terminals from the quantity of target terminals of the first AP to obtain the difference; and when the difference is greater than m times the variance, detects that the first AP is the logical edge AP.

The first quantity threshold may be a value preset by the CI or y times the average quantity of target terminals, where y is a value greater than 1.

In the manner 1, the quantity of target terminals may be the quantity of nomadic terminals.

Manner 2: The CI determines, based on whether each feature of the first AP meets the first condition, that the first AP is the logical edge AP when the first condition is met.

The first condition defines a determining condition between any feature of the first AP and a feature threshold corresponding to a category of the feature. The determining condition between the feature and the feature threshold indicates a value relationship, and the value relationship may be "greater than" or "less than". If the first AP is the logical edge AP, the value relationship between the feature and the feature threshold is consistent with a value relationship indicated by the determining condition.

In the manner 2, each feature of the first AP is compared with a feature threshold corresponding to a category of the feature to obtain a comparison result of the feature. Whether the first AP is the logical edge AP is detected based on a determining condition between each feature and the feature threshold corresponding to the category of the feature, and the comparison result of the feature.

To be specific, in the manner 2, for the any feature, the feature is compared with the feature threshold corresponding to the category of the feature to obtain a comparison result of the feature, where the comparison result is a value relationship between the feature and the feature threshold. Determining that the comparison result is consistent with a value relationship indicated by a determining condition corresponding to the category indicates that the feature is a feature of the first AP conforming to the logical edge AP. In the foregoing manner, if it is learned that each feature of the first AP is a feature of the first AP conforming to the logical edge AP, the first AP is determined as the logical edge AP.

Optionally, for the any feature of the first AP, the first condition includes that the any feature is greater than the feature threshold corresponding to the category of the any feature, or the any feature is less than the feature threshold corresponding to the category of the any feature. Specifically, the first condition includes: the quantity of target terminals of the first AP is greater than the first quantity threshold. In addition to including this condition, the first condition may further include: the total quantity of any type of connection events counted by the CI is greater than a quantity threshold corresponding to the any type of connection events, or the total quantity of any type of connection events is less than the quantity threshold corresponding to the any type of connection events. Alternatively, the first condition may further include at least one of a condition that the signal-to-noise ratio statistical value is less than a signal-to-noise ratio statistical threshold, a condition that the packet loss rate statistical value is greater than a packet loss rate statistical threshold, a condition that the retransmission rate statistical value is greater than a retransmission rate statistical threshold, a condition that the channel utilization statistical value is greater than a channel utilization threshold, or a condition that a total quantity of terminals that access each frequency band of the first AP is greater than a terminal quantity threshold corresponding to the frequency band.

Optionally, the any type of connection events may be one type of weak coverage events or one type of high-latency events. The first condition includes that a total quantity of weak coverage events is greater than a quantity threshold corresponding to the weak coverage events, or a total quantity of high-latency events is greater than a quantity threshold corresponding to the high-latency events.

Optionally, the any type of connection events may be one type of strong coverage events or one type of low-latency events. The first condition includes that a total quantity of strong coverage events is less than a quantity threshold corresponding to the strong coverage events, or a total quantity of low-latency events is less than a quantity threshold corresponding to the low-latency events.

For example, it is assumed that the first AP provides a first frequency band and a second frequency band for terminal access, and the feature of the first AP includes a quantity 50 of target terminals, a quantity 40 of first high-latency events, a quantity 35 of second high-latency events, a quantity 29 of first weak coverage events, a quantity 36 of second weak coverage events, a signal-to-noise ratio statistical value 58, a packet loss rate statistical value 0.35, a retransmission rate statistical value 0.48, a channel utilization statistical value 0.42, a total quantity 48 of terminals that access the first frequency band, and a total quantity 56 of terminals that access the second frequency band.

It is assumed that the first quantity threshold is 30, a quantity threshold corresponding to the first high-latency events is 20, a quantity threshold corresponding to the second high-latency events is 22, a quantity threshold corresponding to the first weak coverage events is 18, a quantity threshold corresponding to the second weak coverage events is 19, the signal-to-noise ratio statistical threshold is 60, the packet loss rate statistical threshold is 0.3, the retransmission rate statistical threshold is 0.4, the channel utilization statistical threshold is 0.35, a terminal quantity threshold corresponding to the first frequency band is 30, and a terminal quantity threshold corresponding to the second frequency band is 25.

The quantity 50 of target terminals of the first AP is greater than the first quantity threshold 30, the quantity 40 of first high-latency events is greater than the quantity threshold 20 corresponding to the first high-latency events, the quantity 35 of second high-latency events is greater than the quantity threshold 22 corresponding to the second high-latency events, the quantity 29 of first weak coverage events is greater than the quantity threshold 18 corresponding to the first weak coverage events, the quantity 36 of second weak coverage events is greater than the quantity threshold 19 corresponding to the second weak coverage events, the signal-to-noise ratio statistical value 58 is less than the signal-to-noise ratio statistical threshold 60, the packet loss rate statistical value 0.35 is greater than the packet loss rate statistical threshold 0.3, the retransmission rate statistical value 0.48 is greater than the retransmission rate statistical threshold 0.4, the channel utilization statistical value 0.42 is greater than the channel utilization statistical threshold 0.35, the total quantity 48 of terminals that access the first frequency band is greater than the terminal quantity threshold 30 corresponding to the first frequency band, and the total quantity 56 of terminals that access the second frequency band is greater than the terminal quantity threshold 25 corresponding to the second frequency band. Therefore, it may be learned that the feature of the first AP meets the first condition, and therefore that the first AP is the logical edge AP is determined.

Compared with the manner 1, in the manner 2, whether the first AP is the logical edge AP is detected based on the quantity of target terminals and another feature of the first AP. Therefore, compared with the manner 1, the manner 2 can improve detection precision.

In the manner 2, before step 202 is performed, a random forest model may be first trained. The trained random forest model has a function of detecting whether the AP is the logical edge AP. The random forest model is used to determine the category corresponding to each feature of the first AP that needs to be obtained and a feature threshold. In this way, in the foregoing steps 202 and 203, only the feature of the first AP that belongs to the determined category needs to be obtained. Then, in this step, whether the first AP is the logical edge AP is detected in the manner 2.

Before the random forest model is trained, a second training set is first constructed. The second training set includes a plurality of training samples and a category corresponding to each training sample, and each training sample is at least one feature of one AP. When the AP is a logical edge AP, a category of the training sample is a positive sample. When the AP is a non-logical edge AP, the category of the training sample is a negative sample.

In this step, for a known logical edge AP in the WLAN, at least one feature of the logical edge AP is obtained by using the foregoing steps 201 to 203, the at least one feature is used as a training sample, and a category of the training sample is set to the positive sample. In addition, for a known non-logical edge AP in the WLAN, at least one feature of the non-logical edge AP is obtained by using the foregoing steps 201 to 203, the at least one feature is used as a training sample, and a category of the training sample is set to the negative sample.

It should be noted that a quantity of training samples of positive samples in the constructed second training set may be small. For example, a quantity of positive samples in the second training set is less than a third quantity threshold. This is mainly because a quantity of logical edge APs is usually small. In any WLAN, there may or may not be logical edge APs in the WLAN. When there are the logical edge APs in the WLAN, a quantity of logical edge APs in the WLAN is small, and usually there are only several logical edge APs. Therefore, a person skilled in the art may not obtain a sufficient quantity of known logical edge APs to form the training samples of the positive samples. Consequently, the quantity of training samples of the positive samples in the constructed second training set is usually small. Certainly, a person skilled in the art may alternatively analyze a large quantity of WLANs to obtain a large quantity of logical edge APs, so that the constructed second training set has a large quantity of training samples of positive samples. In this case, an AI model other than the random forest model may be trained by using the second training set to obtain an intelligent model used to detect the logical edge AP. This implementation is described in detail in the following third manner.

Optionally, the random forest model may be trained by using the following operations 2041 to 2044. The operations 2041 to 2044 are respectively as follows:

2041: Input the training samples in the second training set into the random forest model, where the category of each training sample is the positive sample or the negative sample.

For ease of description, the category of each training sample is referred to as the real category of each training sample.

2042: The random forest model predicts the category of each training sample in the second training set.

For each training sample in the second training set, the random forest model extracts a feature from the training sample; predicts, based on the extracted feature, a first probability that the training sample is a positive sample and a second probability that the training sample is a negative sample, where a sum of the first probability and the second probability is equal to 1. The random forest model outputs the category corresponding to a probability with a larger value in the two probabilities.

2043: For each training sample, the random forest model calculates, by using the loss function, a loss function value of the training sample based on the real category of the training sample and the category that is output after the random forest model predicts the training sample. Further, a parameter of the random forest model is adjusted based on loss function values of all the training samples in the second training set.

2044: The random forest model determines whether to continue training; and when determining to continue training, returns to perform 2042; or when determining to stop training, ends and exits the training process.

Whether to continue training may be determined based on the loss function value. Specifically, in a training process, a loss function value of each training sample is obtained after each training, and curve fitting is performed on the obtained loss function value. If an obtained curve gradually converges and a loss function value obtained after last training is less than a preset threshold, it is determined to stop training. Otherwise, it is determined to continue training.

The random forest model obtained after training includes at least one decision tree, and each path in the decision tree is used to detect whether an AP in the second training set is a logical edge AP. A leaf node of the path is configured to store a detection result of the path, and a node other than the leaf node in the path corresponds to a category and a feature threshold. The node is configured to: determine whether a feature belonging to the category exceeds the feature threshold; and select, based on a determining result, a next-layer node that belongs to the path.

Figure 5:
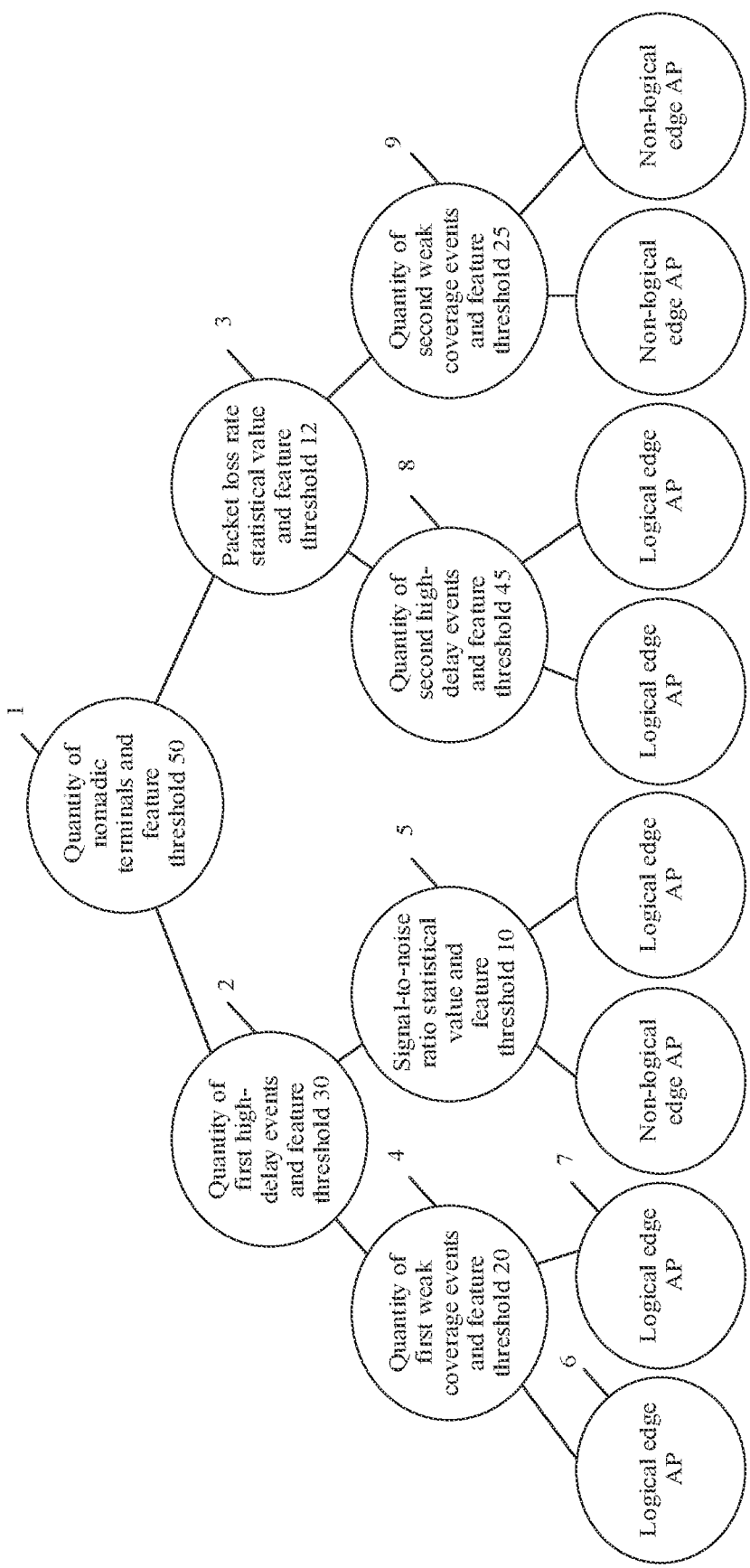
FIG. 5 is a schematic diagram of a structure of a decision tree according to an embodiment.

For example, FIG. 5 shows a decision tree of the random forest model. For any decision tree, each node other than a leaf node in the decision tree stores a category of a feature and a feature threshold. For example, refer to the decision tree shown in FIG. 5. A category stored by a root node 1 is a quantity of nomadic terminals and a feature threshold 50. The root node 1 is configured to: determine whether the quantity of nomadic terminals exceeds the feature threshold 50; and then select a next-layer node of a path based on a determining result, where the next-layer node is a node 2 or a node 3. A category stored by the node 2 is a quantity of first high-latency events and a feature threshold 30. The node 2 is configured to: determine whether the quantity of first high-latency events exceeds the feature threshold 30; and then select a next-layer node of a path based on a determining result, where the next-layer node is a node 4 or a node 5. A category stored by the node 4 is a quantity of first weak coverage events and a feature threshold 20. The node 4 is configured to: determine whether the quantity of first weak coverage events exceeds the feature threshold 20; and then select a next-layer node of a path based on a determining result, where the next-layer node is a leaf node 6 or a leaf node 7. The leaf node 6 or the leaf node 7 is configured to store a detection result of an AP, where the detection result may be a logical edge AP or a non-logical edge AP.

It should be noted that when the quantity of training samples of the positive samples in the second training set is small, the trained random forest model overfits and has a poor model generalization capability. In this way, for the to-be-detected first AP, whether the first AP is the logical edge AP is directly detected by using the trained random forest model, resulting in low detection precision. Therefore, in the manner 2, the first AP is not detected directly by using the trained random forest model. Instead, the category corresponding to each feature of the first AP that needs to be obtained, the feature threshold, and the determining condition between the feature and the feature threshold are determined based on the trained random forest model. Then, the CI may obtain, in the foregoing steps 202 and 203, only the feature corresponding to the determined category. In this way, a quantity of obtained features of the first AP can be reduced, and a calculation amount can be reduced.

Optionally, the following operations (1) to (5) may be performed to determine the category corresponding to each feature of the first AP that needs to be obtained and the feature threshold. The operations (1) to (5) are respectively as follows:

(1) Select a target path from the at least one decision tree, where a detection result of the target path is the logical edge AP.

(2) Obtain, from nodes included in the selected target path, a target node corresponding to a target category and a determining condition corresponding to a determining result of the target node, where the target category is a category to which any feature in the training set belongs.

In the target path, the target node determines a value relationship between the feature belonging to the target category and a feature threshold corresponding to the target node to obtain a determining result, where a determining condition corresponding to the determining result is the value relationship, to be specific, the determining condition corresponding to the determining result may be "greater than" or "less than". The determining condition corresponding to the determining result is used to indicate that the feature is greater than the feature threshold, or the feature is less than the feature threshold.

In this step, a quantity of obtained target nodes may be greater than or equal to 1, a determining condition corresponding to some target nodes may be "greater than", and a determining condition corresponding to a remaining target node may be "less than".

(3) When the quantity of obtained target nodes exceeds a second quantity threshold, determine the target category as a category corresponding to the feature of the first AP that needs to be obtained.

(4) Obtain a feature threshold corresponding to the target category based on the feature threshold corresponding to the obtained target node.

Optionally, an average value is calculated based on feature thresholds corresponding to all obtained nodes, and the average value is used as the feature threshold corresponding to the target category. Alternatively, the feature thresholds corresponding to all the obtained target nodes are sorted, and a feature threshold in a middle position is used as the feature threshold corresponding to the target category.

(5) Count a quantity of target nodes corresponding to each determining condition from the determining condition corresponding to the determining result of the target node, and a determining condition with a maximum quantity of target nodes is selected as the determining condition between the feature of the target category and the feature threshold corresponding to the target category.

Manner 3: At least one feature of the first AP is used as an input to a logical edge AP detection model, and whether the first AP is the logical edge AP is detected by using the logical edge AP detection model. To be specific, in the manner 3, the logical edge AP determines whether the at least one feature of the first AP meets the first condition; and when determining that the first condition is met, outputs a result that the first AP is the logical edge AP.

When the constructed second training set includes the large quantity of training samples of the positive samples, for example, when the quantity of positive samples in the second training set exceeds the third quantity threshold, a second AI model may be trained by using the second training set to obtain the logical edge AP detection model. In addition, in the manner 3, the logical edge AP detection model may be an AI model trained by using a support vector machine (SVM), a linear regression (LR) algorithm, a convolutional neural network (CNN), or the like.

Optionally, the second AI model may be trained by using the following operations 2141 to 2144. The operations 2141 to 2144 are respectively as follows:

2141: Input the training samples in the second training set into the second AI model, where the category of each training sample is the positive sample or the negative sample.

For ease of description, the category of each training sample is referred to as the real category of each training sample.

2142: The second AI model predicts the category of each training sample in the second training set.

For each training sample in the second training set, the second AI model extracts the feature from the training sample; predicts, based on the extracted feature, the first probability that the training sample is the positive sample and the second probability that the training sample is the negative sample, where the sum of the first probability and the second probability is equal to 1. The second AI model outputs the category corresponding to the probability with the larger value in the two probabilities.

2143: For each training sample, the second AI model calculates, by using the loss function, the loss function value of the training sample based on the real category of the training sample and the category that is output after the second AI model predicts the training sample. Further, a network parameter of the second AI model is adjusted based on the loss function values of all the training samples in the second training set.

2144: The second AI module determines whether to continue training; and when determining to continue training, returns to perform 2142; or when determining to stop training, the second AI module ends and exits the training process, where the second AI module is a logical edge AP detection model.

Specifically, in the training process, curve fitting is performed on the obtained loss function value. If the obtained curve gradually converges, and the loss function value obtained after the last training is less than the preset threshold, it is determined to stop training. Otherwise, it is determined to continue training.

Optionally, the CI repeats the foregoing process of 201 to 204 to detect each logical edge AP from APs of the target WLAN.

Step 205: The CI sends an optimization request to the AC, where the optimization request includes an identifier of each logical edge AP.

Optionally, the optimization request may further include information such as a quantity of target terminals of each logical edge AP.

Step 206: The AC may receive the optimization request, and optimize performance of the logical edge AP based on the identifier of the logical edge AP included in the optimization request.

The logical edge AP may be optimized in the following three manners. The three optimization manners are respectively as follows:

In a first optimization manner, the AC may reduce a signal coverage area of the logical edge AP.

The signal coverage area of the logical edge AP usually exceeds a place in which the target WLAN is located, and the signal coverage area of the logical edge AP may include a pedestrian road located outside the place. Therefore, the signal coverage area of the logical edge AP is reduced, so that the signal coverage area of the logical edge AP may not include the pedestrian road located outside the place, thereby reducing the quantity of target terminals that request to access the logical edge AP.

The AC may decrease a transmit power of the logical edge AP to reduce the signal coverage area of the logical edge AP. The AC may decrease transmit powers of the logical edge AP for a plurality of times to gradually reduce the signal coverage area of the logical edge AP. Whether to continue decreasing a transmit power of the logical edge AP is determined after the transmit power of the logical edge AP is decreased each time.

Optionally, the AC may decrease the transmit power of the logical edge AP by using a fixed step. For example, it is assumed that the fixed step is 2 dB, in other words, the AC decreases the transmit power of the logical edge AP by 2 dB each time.

Optionally, when the AC needs to decrease the transmit power of the logical edge AP, the AC may send an instruction to the logical edge AP, where the instruction may include the fixed step. The logical edge AP receives the instruction, and decreases the transmit power of the logical edge AP based on the fixed step in the instruction.

Optionally, before decreasing the transmit power of the logical edge AP each time, the AC may further notify the administrator, to notify the administrator that the transmit power of the logical edge AP needs to be decreased and a power needs to be decreased, and request the administrator for confirmation. After receiving the confirmation from the administrator, the AC decreases the transmit power of the logical edge AP.

After decreasing the transmit power of the logical edge AP, the AC needs to determine whether to continue decreasing the transmit power of the logical edge AP. During implementation, after the transmit power of the logical edge AP is decreased each time, the AC may request the CI to count, based on the foregoing operations in steps 201 and 202, a quantity of target terminals that request to access the logical edge AP within a time period with the duration being the first duration. When the quantity of target terminals that request to access the logical edge AP within the time period is less than the second quantity threshold, continuing decreasing the transmit power of the logical edge AP may be stopped. The second quantity threshold may be a preset threshold, or may be obtained based on a maximum quantity of target terminals, where the maximum quantity of target terminals is a maximum value in quantities of target terminals of the logical edge AP that have been counted. For example, the second quantity threshold may be equal to x times the maximum quantity of target terminals, where x is a value less than 1, and may be a value, for example, 0.1, 0.2, or 0.3.

Alternatively, after decreasing the transmit power of the logical edge AP each time, the AC may obtain a quantity of target terminals that request to access the logical edge AP. For quantities of target terminals obtained by the AC for a plurality of consecutive times, if the AC finds that a difference between any two quantities of target terminals in the plurality of quantities of target terminals is less than a difference threshold, it indicates that the quantity of target terminals that request to access the logical edge AP does not continue to be greatly reduced after the AC decreases the transmit power of the logical edge AP. In this case, the AC also determines to stop decreasing the transmit power of the logical edge AP.

Alternatively, after decreasing the transmit power of the logical edge AP each time, the AC obtains an actual transmit power of the logical edge AP; and when the actual transmit power of the logical edge AP is less than a power threshold, determines to stop decreasing the transmit power of the logical edge AP.

Alternatively, after decreasing the transmit power of the logical edge AP each time, the AC detects whether a coverage vulnerability exists in the target WLAN; and when the coverage vulnerability exists, determines to stop decreasing the transmit power of the logical edge AP.

Optionally, a monitor is disposed in the WLAN. The AC may monitor, by using the monitor, whether the coverage vulnerability exists in the WLAN; and when the coverage vulnerability exists, stop decreasing the transmit power of the logical edge AP. Optionally, the AC may alternatively increase the transmit power of the logical edge AP, and stop increasing the transmit power of the logical edge AP after detecting, by using the monitor, that the coverage vulnerability in the WLAN disappears.

In a second optimization manner, the AC may control the logical edge AP to prevent access of a terminal whose downlink signal strength is less than a downlink signal strength threshold.

The terminal whose downlink signal strength is less than the downlink signal strength threshold is usually located at an edge of the signal coverage area of the logical edge AP, and the edge of the signal coverage area of the logical edge AP may be located outside the place in which the target WLAN is located. Consequently, the terminal is often far from the logical edge AP, resulting in low downlink signal strength of the terminal, where downlink signal strength of the terminal is less than the downlink signal strength threshold.

In the second optimization manner, the AC may send a control instruction to the logical edge AP. After receiving the control instruction, the logical edge AP obtains a downlink signal strength of a terminal when the terminal requests to access the logical edge AP. When the downlink signal strength is less than the downlink signal strength threshold, access of the terminal is rejected, thereby reducing the quantity of target terminals that access the logical edge AP.

In a third optimization manner, the AC may enable a delayed access function of the logical edge AP, to reduce the quantity of target terminals that access the logical edge AP.

The logical edge AP has the delayed access function. After the delayed access function is enabled, the logical edge AP does not immediately perform an access procedure to allow the terminal to access the logical edge AP when a terminal requests to access the logical edge AP, but waits for a period of time. When the waiting time exceeds the first time threshold, the access procedure is performed to allow the terminal to access the logical edge AP.

However, for a nomadic terminal, duration for which the nomadic terminal stays in the signal coverage area of the logical edge AP is usually short and is less than the first time threshold. In this way, when the nomadic terminal enters the signal coverage area of the logical edge AP and requests access, the logical edge AP does not immediately allow the nomadic terminal to access the logical edge AP, but performs the access procedure only after the waiting period of time exceeds the first time threshold. In this way, after the logical edge AP performs the access procedure, the nomadic terminal has left the signal coverage area of the logical edge AP.

Therefore, the logical edge AP stops continuing performing the access procedure, thereby reducing the quantity of nomadic terminals that access the logical edge AP.

Certainly, in addition to the three optimization manners, other optimization manners may be further used. For example, the quantity of target terminals that access the logical edge AP is reduced by increasing an access signal strength threshold of the logical edge AP, or the quantity of target terminals that access the logical edge AP is reduced by deleting a low rate item from a rate set of the logical edge AP. The other manners are not described in detail in this step.

In this embodiment, an AP in a WLAN collects the connection information of the at least one terminal, and sends the collected connection information of the at least one terminal to the CI. The CI obtains at least one feature of the AP based on the connection information of the at least one terminal, where the at least one feature may include a quantity of target terminals of the AP and a total quantity of various types of connection events generated by the at least one terminal; and then detects, based on the at least one feature of the AP, whether the AP is a logical edge AP. Therefore, the logical edge AP can be accurately detected from the AP in the WLAN. In this way, the logical edge AP can be easily processed. For example, performance of the logical edge AP is optimized to reduce or eliminate impact caused by the logical edge AP.

Figure 6:
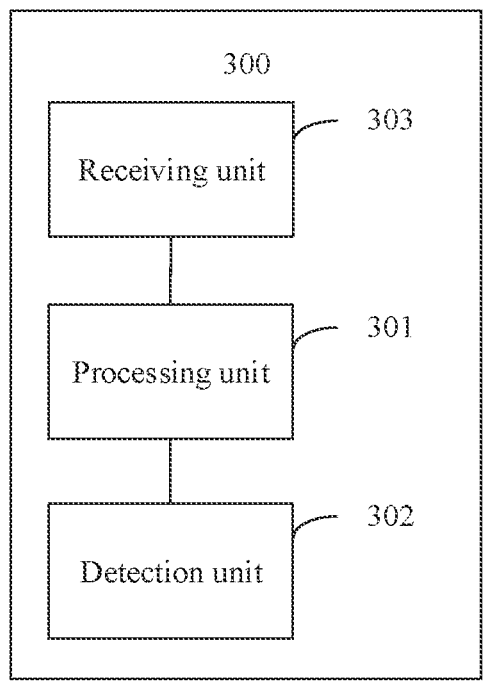
FIG. 6 is a schematic diagram of a structure of a detection apparatus according to an embodiment.

Refer to FIG. 6. An embodiment provides a detection apparatus 300. The apparatus 300 may be deployed on a CI in any one of the foregoing embodiments, and includes: a processing unit 301 configured to obtain at least one feature of a first AP, where the at least one feature includes a quantity of target terminals that request to access the first AP within a time period with duration being first duration, and the target terminal is a terminal whose access status is abnormal; and a detection unit 302 configured to detect, based on the at least one feature, whether the first AP is a logical edge AP, where the logical edge AP is an AP whose signal coverage area reaches an edge of a signal coverage area of a WLAN in which the AP is located.

Optionally, the target terminal includes at least one of a nomadic terminal, a terminal that fails to access, or a terminal that does not belong to a whitelist of the WLAN to which the first AP belongs.

Optionally, the nomadic terminal is a terminal that stays in the accessed AP for duration not exceeding a first time threshold and that does not access any AP in the WLAN within preset duration before accessing the accessed AP and within preset duration after disconnecting from the accessed AP.

Optionally, the detection unit 302 is configured to: when the at least one feature meets a first condition, determine that the first AP is the logical edge AP, where the first condition includes: the quantity of target terminals is greater than a first quantity threshold, the first AP is one of first quantity of APs with a maximum quantity of target terminals in the WLAN, or a difference between the quantity of target terminals and an average quantity of target terminals is greater than a difference threshold, where the difference threshold is equal to m times a variance, m is greater than 1, and the average quantity of target terminals and the variance are obtained based on a quantity of target terminals of each AP in the WLAN.

Optionally, the target terminal includes at least one of the nomadic terminal or the terminal that does not belong to the whitelist.

The apparatus 300 further includes a receiving unit 303.

The receiving unit 303 is configured to receive connection information of at least one terminal collected by the first AP, where the connection information includes an identifier of the terminal, and the at least one terminal is a terminal that accesses the first AP.

The processing unit 301 is configured to: determine the target terminals from the at least one terminal based on the connection information of the at least one terminal; and count the quantity of the determined target terminals.

Optionally, an interval at which the first AP is configured to collect connection information from a same terminal for two consecutive times does not exceed an interval threshold, and the connection information further includes collection time points.

The processing unit 301 is configured to: obtain a connection information sequence of any terminal in the at least one terminal, where the connection information sequence includes connection information arranged based on collection time points, each piece of connection information in the connection information sequence includes an identifier of the any terminal, and an interval between collection time points of two pieces of adjacent connection information in the connection information sequence does not exceed the interval threshold; and determine, based on the connection information sequence, whether the any terminal is a nomadic terminal.

Optionally, the processing unit 301 is configured to: obtain, based on the connection information sequence, a start time point at which the any terminal accesses the first AP, stay duration of the any terminal in the first AP, and a disconnection time point at which the any terminal disconnects from the first AP; and determine that the any terminal is the nomadic terminal when the stay duration does not exceed the first time threshold and there is no connection information of the any terminal collected by a second AP within preset duration before the start time point and within preset duration after the disconnection time point, where the second AP is an AP other than the first AP in the WLAN, and the preset duration is greater than the interval threshold.

Optionally, the processing unit 301 is configured to: use the connection information sequence as an input to a terminal detection model; and detect whether the any terminal is the nomadic terminal by using the terminal detection model.

Optionally, the at least one feature further includes a total quantity of each type of connection events in at least one type of connection events of the at least one terminal; and for any type of connection events in each type of connection events, the first condition further includes that a total quantity of any type of connection events is greater than a quantity threshold corresponding to the any type of connection events, or the first condition further includes that a total quantity of any type of connection events is less than a quantity threshold corresponding to the any type of connection events.

Optionally, the connection information of the any terminal further includes at least one of an uplink signal strength of the any terminal or a data transmission latency of the any terminal.

The processing unit 301 is further configured to: obtain a connection event of the any terminal based on at least one of an uplink signal strength or a data transmission latency included in a last piece of connection information in the connection information sequence of the any terminal; and count a total quantity of any type of connection events.

Optionally, the first condition includes that a total quantity of weak coverage events is greater than a quantity threshold corresponding to the weak coverage events.

The processing unit 301 is configured to: obtain, from strength thresholds in correspondences between the strength thresholds and weak coverage events, a strength threshold greater than the uplink signal strength included in the last piece of connection information; and obtain, based on the obtained strength threshold, a corresponding weak coverage event from the correspondences between the strength thresholds and the weak coverage events; and use the corresponding weak coverage event as the connection event of the any terminal.

Optionally, the first condition includes that a total quantity of high-latency events is greater than a quantity threshold corresponding to the high-latency events.

The processing unit 301 is configured to: obtain, from latency thresholds in correspondences between the latency thresholds and high-latency events, a latency threshold greater than the data transmission latency included in the last piece of connection information; and obtain, based on the obtained latency threshold, a corresponding high-latency event from the correspondence between the latency thresholds and the high-latency events; and use the corresponding high-latency event as the connection event of the any terminal.

Optionally, the connection information further includes at least one of a signal-to-noise ratio, a packet loss rate, a retransmission rate, channel utilization of the terminal, and an identifier of a frequency band accessed by the terminal.

The at least one feature further includes at least one of a signal-to-noise ratio statistical value, a packet loss rate statistical value, a retransmission rate statistical value, a channel utilization statistical value, or a total quantity of terminals that access the frequency band corresponding to the identifier of the frequency band; and the signal-to-noise ratio statistical value is obtained based on a signal-to-noise ratio of the at least one terminal, the packet loss rate statistical value is obtained based on a packet loss rate of the at least one terminal, the retransmission rate statistical value is obtained based on a retransmission rate of the at least one terminal, and the channel utilization statistical value is obtained based on channel utilization of the at least one terminal.

The first condition further includes at least one of a condition that the signal-to-noise ratio statistical value is less than a signal-to-noise ratio statistical threshold, a condition that the packet loss rate statistical value is greater than a packet loss rate statistical threshold, a condition that the retransmission rate statistical value is greater than a retransmission rate statistical threshold, a condition that the channel utilization statistical value is greater than a channel utilization threshold, or a condition that the total quantity of terminals is greater than a terminal quantity threshold.

Optionally, the processing unit 301 is further configured to: train a random forest model by using a training set, where the training set includes a plurality of training samples and a category corresponding to each training sample, a training sample whose category is a positive sample includes at least one feature of a logical edge AP, and a training sample whose category is a negative sample includes at least one feature of a non-logical edge AP; the trained random forest model includes at least one decision tree, each path in the decision tree is used to detect whether any AP in the training set is a logical edge AP, a leaf node of the path is configured to store a detection result of the path, and a node other than the leaf node in the path corresponds to a category and a feature threshold; the node is configured to determine whether a first feature exceeds the feature threshold corresponding to the node, and select, based on a determining result, a next-layer node that belongs to the path; and the first feature is a feature of the any AP that belongs to the category corresponding to the node; and determine, based on the at least one decision tree, a category corresponding to each feature of the first AP that needs to be obtained, a feature threshold, and a determining condition between the feature and the feature threshold.

Optionally, the processing unit 301 is configured to: select a target path from the at least one decision tree, where a detection result of the target path is a logical edge AP; obtain, from nodes included in the selected target path, a target node corresponding to a target category and a determining condition corresponding to a determining result of the target node, where the target category is a category to which any feature in the training set belongs; when a quantity of obtained target nodes exceeds a second quantity threshold, determine the target category as the category corresponding to the feature of the first AP that needs to be obtained; and obtain, based on a feature threshold corresponding to the obtained target node, a feature threshold corresponding to the target category; count, from the determining condition corresponding to the determining result of the target node, a quantity of target nodes corresponding to each determining condition; and select a determining condition with a maximum quantity of target nodes as a determining condition between a feature of the target category and the feature threshold corresponding to the target category.

Optionally, the detection unit 302 is configured to: use the at least one feature as an input to a logical edge AP recognition model; and detect whether the first AP is the logical edge AP by using the logical edge AP recognition model.

Optionally, the processing unit 301 is further configured to: when it is detected that the first AP is the logical edge AP, indicate an AC to reduce a signal coverage area of the first AP, indicate the AC to control the first AP to prevent a terminal whose downlink signal strength is less than a downlink signal strength threshold from accessing the first AP, or indicate the AC to enable a delayed access function of the first AP.

In this embodiment, the processing unit obtains the at least one feature of the first AP, where the at least one feature includes the quantity of target terminals that request to access the first AP within the time period with the duration being the first duration, and the target terminal is the terminal whose access status is abnormal. The detection unit detects, based on the at least one feature, whether the first AP is the logical edge AP. The obtained feature of the first AP includes the quantity of target terminals that request to access the first AP within the time period with the duration being the first duration, and the target terminal is the terminal whose access status is abnormal. Therefore, the detection unit can successfully detect whether the first AP is the logical edge AP based on the feature of the first AP.

Figure 7:
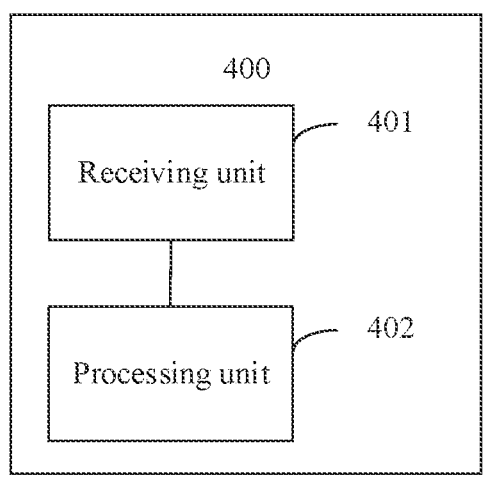
FIG. 7 is a schematic diagram of a structure of another detection apparatus according to an embodiment.

Refer to FIG. 7. An embodiment provides a detection apparatus 400. The apparatus 400 may be deployed on a CI in any one of the foregoing embodiments, and includes: a receiving unit 401 configured to receive connection information of at least one terminal collected by a first AP, where the connection information includes an identifier of the terminal and a collection time point at which the connection information is collected, and the at least one terminal is a terminal that accesses the first AP; and a processing unit 402 configured to obtain a connection information sequence of any terminal in the at least one terminal, where the connection information sequence includes connection information arranged based on collection time points, each piece of connection information in the connection information sequence includes an identifier of the any terminal, and an interval between collection time points of two pieces of adjacent connection information in the connection information sequence does not exceed an interval threshold, where the processing unit 402 is further configured to determine, based on the connection information sequence, whether the any terminal is a nomadic terminal.

Optionally, the processing unit 402 is configured to: obtain, based on the connection information sequence, a start time point at which the any terminal accesses the first AP, stay duration of the any terminal in the first AP, and a disconnection time point at which the any terminal disconnects from the first AP; and determine that the any terminal is the nomadic terminal when the stay duration does not exceed a first time threshold and there is no connection information of the any terminal collected by a second AP within preset duration before the start time point and within preset duration after the disconnection time point, where the second AP is an AP other than the first AP in a WLAN to which the first AP belongs.

In this embodiment, the connection information of the at least one terminal collected by the first AP is received by using the receiving unit. The connection information includes the identifier of the terminal and the collection time point at which the connection information is collected. Therefore, the processing unit may obtain the connection information sequence of the any terminal, where the connection information sequence includes the connection information arranged based on the collection time points, each piece of connection information in the connection information sequence includes the identifier of the any terminal, and the interval between the collection time points of the two pieces of adjacent connection information in the connection information sequence does not exceed the interval threshold. In this way, the processing unit can successfully determine, based on the connection information sequence, whether the any terminal is the nomadic terminal.

Figure 8:
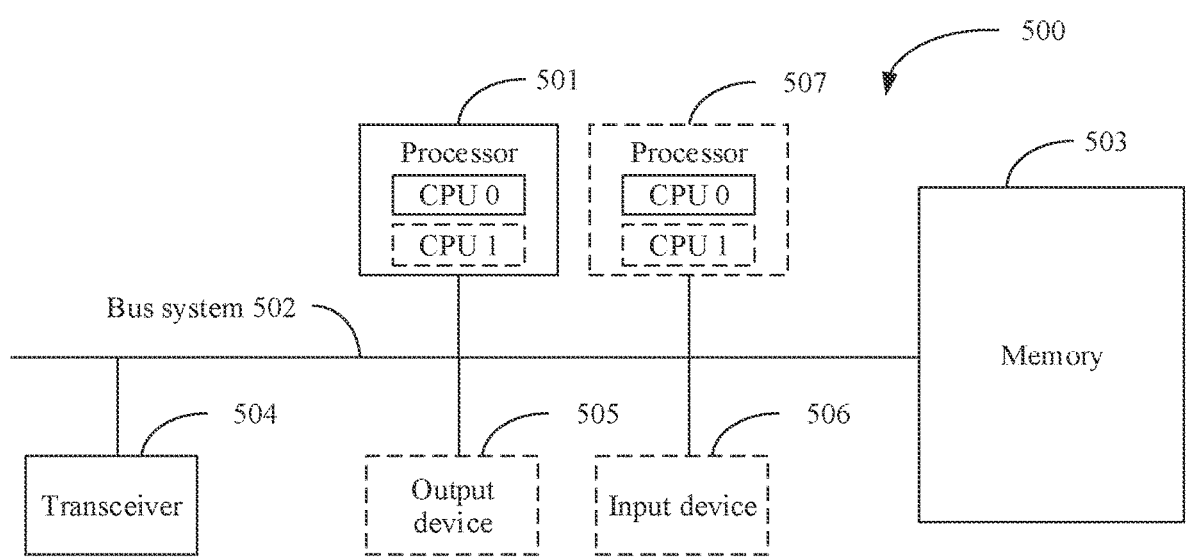
FIG. 8 is a schematic diagram of a structure of another detection apparatus according to an embodiment.

FIG. 8 is a schematic diagram of a detection apparatus 500 according to an embodiment. The apparatus 500 includes at least one processor 501, a bus system 502, a memory 503, and at least one transceiver 504.

The apparatus 500 is an apparatus with a hardware structure, and may be configured to implement functional modules in the apparatus 300 shown in FIG. 6 or the apparatus 400 shown in FIG. 7. For example, a person skilled in the art may figure out that the processing unit 301 and the detection unit 302 in the apparatus 300 shown in FIG. 6, or the processing unit 402 in the apparatus 400 shown in FIG. 7 may be implemented by invoking code in the memory 503 by the at least one processor 501. The receiving unit 303 in the apparatus 300 shown in FIG. 6 or the receiving unit 401 in the apparatus 400 shown in FIG. 7 may be implemented by using the transceiver 504.

Optionally, the apparatus 500 may be further configured to implement functions of the CI in any one of the foregoing embodiments.

Optionally, the processor 501 may be a general-purpose central processing unit (CPU), a microprocessor, an application-specific integrated circuit (ASIC), or one or more integrated circuits configured to control program execution of the solutions.

The bus system 502 may include a path for transmitting information between the foregoing components.

The transceiver 504 is configured to communicate with another device or a communication network.

The memory 503 may be a read-only memory (ROM) or another type of static storage device that can store static information and instructions, or a random-access memory (RAM) or another type of dynamic storage device that can store information and instructions; or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through the bus system. The memory may alternatively be integrated with the processor.

The memory 503 is configured to store application program code for performing the solutions, and the processor 501 controls the execution. The processor 501 is configured to execute the application program code stored in the memory 503, to implement functions in the method in this patent.

In specific implementation, in an embodiment, the processor 501 may include one or more CPUs, for example, a CPU 0 and a CPU 1 in FIG. 8.

In specific implementation, in an embodiment, the apparatus 500 may include a plurality of processors, for example, the processor 501 and a processor 507 shown in FIG. 8. Each of the processors may be a single-core processor, or may be a multi-core processor. The processor herein may refer to one or more devices, circuits, and/or processing cores configured to process data (for example, computer program instructions).

In specific implementation, in an embodiment, the apparatus 500 may further include an output device 505 and an input device 506. The output device 505 communicates with the processor 501, and may display information in a plurality of manners. For example, the output device 505 may be a liquid-crystal display (LCD), or the like. The input device 506 communicates with the processor 501, and may receive user input in a plurality of manners. For example, the input device 506 may be a touchscreen device, a sensor device, or the like.

A person of ordinary skill in the art may understand that all or some of the steps in the embodiments may be implemented by hardware or a program instructing related hardware. The program may be stored in a computer-readable storage medium. The storage medium may be a read-only memory, a magnetic disk, an optical disc, or the like.

The foregoing descriptions are merely some embodiments, but are not intended to limit this disclosure. Any modification, equivalent replacement, or improvement made without departing from the disclosed principles should fall within the protection scope of this disclosure.

What is claimed is:

1. A method comprising:
obtaining at least one feature of a first access point (AP) by:
receiving, from the first AP, connection information of terminals accessing the first AP, wherein the connection information comprises first identifiers of the terminals;
determining, from the terminals and based on the connection information, target terminals that have requested to access the first AP within a first duration and that have an access status that is abnormal, wherein the target terminals comprise a nomadic terminal or a first terminal that is not on a whitelist of a wireless local area network (WLAN) in which the first AP is located; and
counting a quantity of the target terminals, wherein the at least one feature comprises the quantity; and
detecting, based on the at least one feature and based on a threshold, whether the first AP is a logical edge AP whose signal coverage area reaches an edge of a first signal coverage area of the WLAN.

2. The method of claim 1, wherein the target terminals further comprise a second terminal that fails to access the first APs.

3. The method of claim 2, wherein the nomadic terminal stays in an accessed AP for a duration not exceeding a first time threshold, and wherein the nomadic terminal does not access another AP in the WLAN within a first preset duration before accessing the accessed AP and does not access another AP in the WLAN within a second preset duration after disconnecting from the accessed AP.

4. The method of claim 1, wherein detecting whether the first AP is the logical edge AP comprises determining, when the at least one feature meets a condition, that the first AP is the logical edge AP, wherein the condition comprises that the quantity is greater than a quantity threshold or a difference between the quantity and an average quantity of target terminals is greater than a difference threshold, wherein the difference threshold is equal to m times a variance, wherein m is greater than 1, wherein the average quantity and the variance are based on a quantity of target terminals of each AP in the WLAN, and wherein the threshold comprises the quantity threshold or the difference threshold.

5. The method of claim 1, further comprising:
further receiving the connection information in connection information sequences of the terminals, wherein the connection information sequences comprise the connection information arranged based on collection time points, and wherein intervals between collection time points of adjacent connection information do not exceed an interval threshold; and
determining, based on the connection information sequences, whether the terminals are nomadic terminals.

6. The method of claim 5, further comprising:
using the connection information sequences as inputs to a terminal detection model; and
further determining whether the terminals are nomadic terminals using the terminal detection model.

7. The method of claim 5, wherein the at least one feature further comprises a total quantity of each type of connection event in at least one type of connection event of the terminals, wherein the at least one feature meets a condition, wherein the condition comprises that the total quantity is greater than a first quantity threshold corresponding to each type of connection event or comprises that the total quantity of each type of connection event is less than a second quantity threshold corresponding to each type of connection event, and wherein the threshold comprises the first quantity threshold or the second quantity threshold.

8. The method of claim 7, wherein the connection information further comprises uplink signal strengths of the terminals or data transmission latencies of the terminals, and wherein the method further comprises:
obtaining the connection events based on the uplink signal strengths or the data transmission latencies; and
counting the total quantity of any type of connection event.

9. The method of claim 1, wherein the connection information further comprises signal-to-noise ratios, packet loss rates, retransmission rates, channel utilizations of the terminals, or second identifiers of frequency bands accessed by the terminals, wherein the at least one feature further comprises a signal-to-noise ratio statistical value, a packet loss rate statistical value, a retransmission rate statistical value, a channel utilization statistical value, or a second total quantity of the terminals that have accessed the frequency bands corresponding to the second identifiers, and wherein the first AP is the logical edge AP when the signal-to-noise ratio statistical value is less than a signal-to-noise ratio statistical threshold, the packet loss rate statistical value is greater than a packet loss rate statistical threshold, the retransmission rate statistical value is greater than a retransmission rate statistical threshold, the channel utilization statistical value is greater than a channel utilization threshold, or the second total quantity is greater than a terminal quantity threshold.

10. The method of claim 1, further comprising:
using the at least one feature as an input to a logical edge AP recognition model; and
further detecting whether the first AP is the logical edge AP using the logical edge AP recognition model.

11. The method of claim 1, further comprising instructing, when the first AP is the logical edge AP, an access controller (AC) to reduce a second signal coverage area of the first AP, control the first AP to prevent a terminal whose downlink signal strength is less than a downlink signal strength threshold from accessing the first AP, or enable a delayed access function of the first AP.

12. An apparatus comprising:
a memory configured to store instructions; and
one or more processors coupled to the memory and configured to execute the instructions to cause the apparatus to:
obtain at least one feature of a first access point (AP) by:
receiving, from the first AP, connection information of terminals accessing the first AP, wherein the connection information comprises first identifiers of the terminals;
determining, from the terminals and based on the connection information, target terminals that have requested to access the first AP within a first duration and that have an access status that is abnormal, wherein the target terminals comprise a nomadic terminal or a first terminal that is not on a whitelist of a wireless local area network (WLAN) in which the first AP is located; and
counting a quantity of the target terminals, wherein the at least one feature comprises the quantity; and
detect, based on the at least one feature and based on a threshold, whether the first AP is a logical edge AP whose signal coverage area reaches an edge of a first signal coverage area of the WLAN.

13. The apparatus of claim 12, wherein the target terminals further comprise a second terminal that fails to access the first AP.

14. The apparatus of claim 13, wherein the nomadic terminal stays in an accessed AP for a duration not exceeding a first time threshold, and wherein the nomadic terminal does not access another AP in the WLAN within a first preset duration before accessing the accessed AP and does not access another AP within a second preset duration after disconnecting from the accessed AP.

15. The apparatus of claim 12, wherein the one or more processors are further configured to execute the instructions to cause the apparatus to detect whether the first AP is the logical edge AP by determining, when the at least one feature meets a condition, that the first AP is the logical edge AP, wherein the condition comprises that the quantity is greater than a quantity threshold or a difference between the quantity and an average quantity of target terminals is greater than a difference threshold, wherein the difference threshold is equal to m times a variance, wherein m is greater than 1, wherein the average quantity and the variance are based on a quantity of target terminals of each AP in the WLAN, and wherein the threshold comprises the quantity threshold or the difference threshold.

16. The apparatus of claim 12, wherein the one or more processors are further configured to execute the instructions to cause the apparatus to:
further receive the connection information in connection information sequences of the terminals, wherein the connection information sequences comprise the connection information arranged based on collection time points, and wherein intervals between collection time points of adjacent connection information do not exceed an interval threshold; and
determine, based on the connection information sequences, whether the terminals are nomadic terminals.

17. The apparatus of claim 16, wherein the one or more processors are further configured to execute the instructions to cause the apparatus to:
use the connection information sequences as inputs to a terminal detection model; and
further determine whether the terminals are nomadic terminals using the terminal detection model.

18. The apparatus of claim 16, wherein the at least one feature further comprises a total quantity of each type of connection events in at least one type of connection event of the terminals, wherein the at least one feature meets a condition, wherein the condition comprises that the total quantity is greater than a first quantity threshold corresponding to each type of connection event or comprises that the total quantity of each type of connection event is less than a second quantity threshold corresponding to the each type of connection event, and wherein the threshold comprises the first quantity threshold or the second quantity threshold.

19. The apparatus of claim 18, wherein the connection information further comprises uplink signal strengths of the terminals or data transmission latencies of the terminals, and wherein the one or more processors are further configured to execute the instructions to cause the apparatus to:
obtain the connection events based on the uplink signal strengths or the data transmission latencies; and
count the total quantity of any type of connection event.

20. The apparatus of claim 12, wherein the connection information further comprises signal-to-noise ratios, packet loss rates, retransmission rates, channel utilizations of the terminals, or second identifiers of frequency bands accessed by the terminals, wherein the at least one feature further comprises a signal-to-noise ratio statistical value, a packet loss rate statistical value, a retransmission rate statistical value, a channel utilization statistical value, or a second total quantity of the terminals that have accessed the frequency bands corresponding to the second identifiers, and wherein the first AP is the logical edge AP when the signal-to-noise ratio statistical value is less than a signal-to-noise ratio statistical threshold, the packet loss rate statistical value is greater than a packet loss rate statistical threshold, the retransmission rate statistical value is greater than a retransmission rate statistical threshold, the channel utilization statistical value is greater than a channel utilization threshold, or the second total quantity is greater than a terminal quantity threshold.

21. The apparatus of claim 12, wherein the one or more processors are further configured to execute the instructions to cause the apparatus to:
use the at least one feature as an input to a logical edge AP recognition model; and
further detect whether the first AP is the logical edge AP using the logical edge AP recognition model.

22. The apparatus of claim 12, wherein when the first AP is the logical AP, the one or more processors are further configured to execute the instructions to cause the apparatus to instruct an access controller (AC) to reduce a second signal coverage area of the first AP, control the first AP to prevent a terminal whose downlink signal strength is less than a downlink signal strength threshold from accessing the first AP, or enable a delayed access function of the first AP.

23. A system comprising:
a first access point (AP) in a wireless local area network (WLAN) and configured to:
collect connection information of at least one terminal accessing the first AP, wherein the connection information comprises an identifier of each of the at least one terminal and a collection time at which the first AP collects the connection information, and send the connection information; and
a data analyzer is configured to:
receive the connection information from the first AP, obtain at least one feature of the first AP based on the connection information,
wherein the at least one feature comprises a quantity of target terminals that have requested to access the first AP within a first duration, and wherein the target terminals comprise a nomadic terminal or a first terminal that is not on a whitelist of the WLAN,
detect, based on the at least one feature and based on a threshold, whether the first AP is a logical edge AP whose signal coverage area reaches an edge of a first signal coverage area of the WLAN, and
send an optimization request when the first AP is the logical edge AP, wherein the optimization request comprises an identifier of the first AP, and
wherein the system further comprises an access controller (AC) configured to:
receive the optimization request from the data analyzer; and
reduce a second signal coverage area of the first AP, control the first AP to prevent a terminal whose downlink signal strength is less than a downlink signal strength threshold from accessing the first AP, or enable a delayed access function of the first AP.

24. The system of claim 23, wherein the target terminals further comprise a second terminal that fails to access the first AP.

25. The system of claim 24, wherein the nomadic terminal stays in an accessed AP for a duration not exceeding a first time threshold, and wherein the nomadic terminal does not access another AP in the WLAN within a first preset duration before accessing the accessed AP and does not access another AP in the WLAN within a second preset duration after disconnecting from the accessed AP.

26. The system of claim 23, wherein the data analyzer is further configured to:
- use the at least one feature as an input to a logical edge AP recognition model; and
- further detect whether the first AP is the logical edge AP using the logical edge AP recognition model.

\* \* \* \* \*